(12) United States Patent
Bachmaier et al.

(10) Patent No.: US 10,205,404 B2
(45) Date of Patent: *Feb. 12, 2019

(54) POWER CONVERTER CONTROL SYSTEM AND METHOD

(71) Applicant: GENERAL ELECTRIC COMPANY, Schenectady, NY (US)

(72) Inventors: Paul Bachmaier, Erie, PA (US); Ajith Kuttannair Kumar, Erie, PA (US); Kevin Michael Jones, Erie, PA (US)

(73) Assignee: General Electric Company, Schenectady, NY (US)

( * ) Notice: Subject to any disclaimer, the term of this patent is extended or adjusted under 35 U.S.C. 154(b) by 150 days.

This patent is subject to a terminal disclaimer.

(21) Appl. No.: 15/231,408

(22) Filed: Aug. 8, 2016

(65) Prior Publication Data
US 2016/0347179 A1 Dec. 1, 2016

Related U.S. Application Data

(63) Continuation-in-part of application No. 13/598,679, filed on Aug. 30, 2012, now Pat. No. 9,409,482.
(Continued)

(51) Int. Cl.
*H02J 1/00* (2006.01)
*H02M 7/537* (2006.01)
(Continued)

(52) U.S. Cl.
CPC ............. *H02M 7/537* (2013.01); *B60L 1/003* (2013.01); *B60L 1/02* (2013.01); *B60L 1/14* (2013.01);
(Continued)

(58) Field of Classification Search
CPC ...... Y02T 10/7077; Y02T 90/16; B60L 1/003; B60L 11/126; B60L 15/2009;
(Continued)

(56) References Cited

U.S. PATENT DOCUMENTS 4,920,532 A 4/1990 Wroblewski
5,210,846 A 5/1993 Lee
(Continued)

*Primary Examiner* — Jared Fureman
*Assistant Examiner* — Duc M Pham
(74) *Attorney, Agent, or Firm* — Christopher R. Carroll; The Small Patent Law Group LLC

(57) ABSTRACT

A power converter control system includes a first power converter, at least one additional power converter, a first control module, and an additional control module. The first power converter receives direct current and outputs alternating current as a first power output. The additional power converter receives direct current and outputs alternating current as an additional power output. The first control module controls timing of events of the first power converter. The additional control module is associated with the additional power converter and controls timing of events of the additional power converter. The first control module communicates first information regarding the timing of the first power converter to the additional control module. The additional control module is configured to adjust the timing of the additional power converter to correspond with the timing of the first power converter.

33 Claims, 9 Drawing Sheets

Related U.S. Application Data

(60) Provisional application No. 61/625,127, filed on Apr. 17, 2012.

(51) Int. Cl.

| | |
|---|---|
| *B60L 1/00* | (2006.01) |
| *B60L 1/02* | (2006.01) |
| *B60L 1/14* | (2006.01) |
| *B60L 3/00* | (2006.01) |
| *B60L 7/14* | (2006.01) |
| *B60L 9/22* | (2006.01) |
| *B60L 11/12* | (2006.01) |
| *B60L 11/18* | (2006.01) |
| *B60L 15/20* | (2006.01) |
| *H02M 7/493* | (2007.01) |

(52) U.S. Cl.
CPC ............ *B60L 3/0061* (2013.01); *B60L 7/14* (2013.01); *B60L 9/22* (2013.01); *B60L 11/126* (2013.01); *B60L 11/1864* (2013.01); *B60L 15/2009* (2013.01); *H02M 7/493* (2013.01); *B60L 2200/26* (2013.01); *B60L 2200/32* (2013.01); *B60L 2200/40* (2013.01); *B60L 2210/40* (2013.01); *B60L 2240/421* (2013.01); *B60L 2240/423* (2013.01); *Y02T 10/6217* (2013.01); *Y02T 10/645* (2013.01); *Y02T 10/7005* (2013.01); *Y02T 10/7061* (2013.01); *Y02T 10/7077* (2013.01); *Y02T 10/7241* (2013.01); *Y02T 10/7275* (2013.01); *Y02T 90/16* (2013.01); *Y10T 307/406* (2015.04)

(58) Field of Classification Search
CPC ............ B60L 2200/26; B60L 2210/40; B60L 2240/421; H02M 7/493; H02M 7/537; Y10T 307/406

See application file for complete search history.

(56) References Cited

U.S. PATENT DOCUMENTS

| | | |
|---|---|---|
| 5,398,326 A | 3/1995 | Lee |
| 5,495,240 A | 2/1996 | Heberle |
| 5,701,330 A | 12/1997 | Lippmann |
| 5,809,518 A | 9/1998 | Lee |
| 6,108,751 A | 8/2000 | Lee |
| 6,112,275 A | 8/2000 | Curry |
| 6,275,167 B1 | 8/2001 | Dombrowski |
| 6,754,841 B2 | 6/2004 | Yang |
| 7,028,105 B2 | 4/2006 | Dute |
| 7,053,667 B1 | 5/2006 | Tang |
| 7,782,240 B2 | 8/2010 | Ng |
| 7,836,232 B2 | 11/2010 | Lee |
| 7,956,489 B2 * | 6/2011 | Ichikawa ............ B60L 11/1868 307/10.1 |
| 8,217,533 B2 * | 7/2012 | Jones ........................ H02J 3/01 307/82 |
| 9,409,482 B2 * | 8/2016 | Bachmaier ............ H02M 7/493 |
| 2009/0212626 A1 * | 8/2009 | Snyder ..................... B60K 6/28 307/10.1 |
| 2013/0313059 A1 * | 11/2013 | Inarida ..................... B60L 9/28 191/57 |

\* cited by examiner

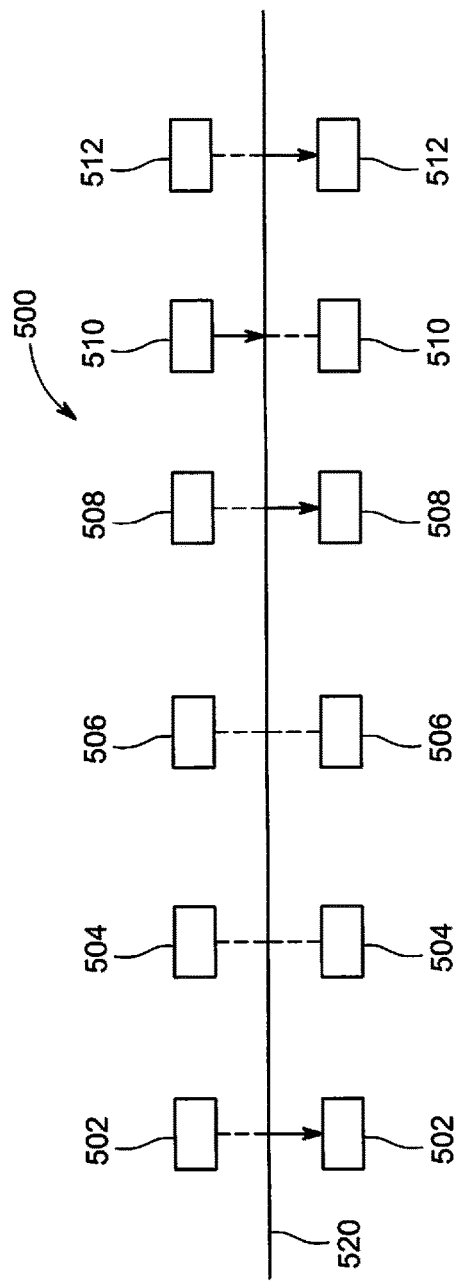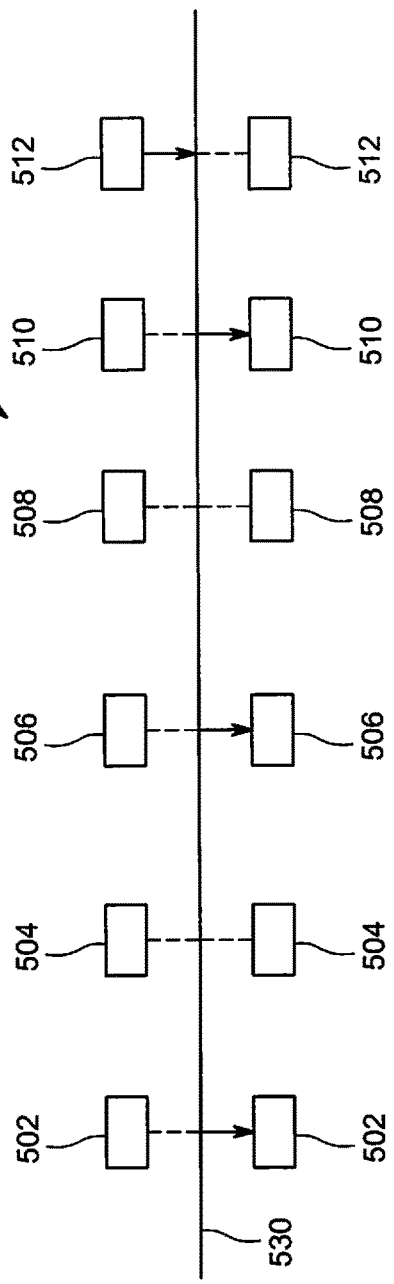
FIG. 5A
FIG. 5B

POWER CONVERTER CONTROL SYSTEM AND METHOD

CROSS-REFERENCE TO RELATED APPLICATIONS

This application is a continuation-in-part of U.S. non-provisional application Ser. No. 13/598,679, which was filed 30 Aug. 2012, which in turns claims priority to U.S. provisional application Ser. No. 61/625,127, which was filed on 17 Apr. 2012. The subject matter of U.S. application Ser. No. 13/598,679 and U.S. application Ser. No. 61/625,127 are both hereby incorporated by reference in their entirety.

TECHNICAL FIELD

Embodiments of the invention relate to power converter systems. Other embodiments relate to power converters for converting direct current energy from a power source to alternating current energy for use by one or more electric loads.

BACKGROUND

In certain applications, it is desired to use energy from a direct current (DC) source with devices and/or systems that are configured to utilize alternating current (AC) energy. In such applications, an inverter may be used. Inverters are used to convert a direct current supplied by a source to alternating current for use by devices and/or systems.

Examples of such applications may be found in vehicle systems. For example, rail vehicle systems may include one or more powered units (such as locomotives) used to transport one or more non-powered units, such as passenger and/or freight cars. The non-powered units may require AC power for correct operation. Such power may be provided, for example, from a powered unit to one or more non-powered units in a head end power ("HEP") arrangement. For example, if the non-powered units are used as passenger cars, then power may be required for heating or cooling a passenger car, providing lighting for the passenger car, or outlet power for other passenger necessities or conveniences. Similarly, if the non-powered units are used as cargo cars, such cars may also require power for lighting, refrigeration, or other uses. Such power may be provided from a powered unit through an HEP system.

The powered units of such a vehicle system typically utilize a direct current energy source, such as a battery and/or generator that is charged or powered by a prime mover, such as a diesel engine. However, the non-powered units, and/or portions of the powered unit, may be configured to utilize alternating current. Thus, one or more inverters may be used to convert the power from the direct current source to alternating current for use in non-powered cars or those portions of powered units that utilize alternating current.

Some known inverters, however, suffer from certain practical drawbacks. As one example, the amount of power required for certain HEP applications may exceed the capacity or capabilities of practical and/or available inverters. In such circumstances, more than one inverter may be used. However, the alternating current output of the inverters may then differ, for example, in period and/or in the timing of certain events in their output wave, such as upper or lower peaks. The resulting unsynchronized or mismatched outputs can then result in reduced efficiency and/or performance caused for example by interference, noise, and/or various output waves cancelling each other out.

BRIEF DESCRIPTION

In one embodiment, a power converter control system includes a first power converter, at least one additional power converter, a first control module, and at least one additional control module. As used herein, the term "module" includes a hardware and/or software system that operates to perform one or more functions. For example, a module may include a computer processor, controller, or other logic-based device that performs operations based on instructions stored on a tangible and non-transitory computer readable storage medium, such as a computer memory. Alternatively, a module may include a hard-wired device that performs operations based on hard-wired logic of the device. The modules shown in the attached figures may represent the hardware that operates based on software or hardwired instructions, the software that directs hardware to perform the operations, or a combination thereof.

The first power converter is configured to receive direct current and output alternating current as a first power output. The at least one additional power converter is configured to receive direct current and output alternating current as at least one additional power output. The first control module is configured to control timing of events of the first power converter. The at least one additional control module is associated with the at least one additional power converter and is configured to control timing of events of the at least one additional power converter. The first control module is configured to communicate first information regarding the timing of the first power converter to the at least one additional control module. The at least one additional control module is configured to adjust the timing of the at least one additional power converter to correspond with the timing of the first power converter.

In another embodiment, another power converter control system includes a first module and a second module. The first module is configured to control a first power converter that provides a first power output. The second module is configured to control a second power converter that provides a second power output. The first module is configured to communicate first timing information corresponding to timing of events in the first power converter to the second module via a communication link. As used herein, the term "timing information" can represent the times at which and/or time periods over which one or more events in the power converters occur. The second module is configured to adjust timing of events in the second power converter to coincide with the events in the first power converter.

In another embodiment, a method (e.g., for temporally synchronizing power outputs and/or other events of multiple power converters) includes obtaining first timing information representative of timing of events in a first power converter, and communicating the first timing information to a second power converter control module that is configured to control timing of events in a second power converter. The method also includes, in a first mode of operation, adjusting the timing of the events in the second power converter, responsive to the first timing information that is received, to substantially synchronize the timing of the events in the second power converter with the timing of the events in the first power converter.

In another embodiment, a power converter control system includes a first power converter, at least one additional power converter, a first control module, and at least one additional control module. The first power converter is configured to be disposed on a first vehicle. The first power converter is configured to receive direct current and to output alternating current as a first power output. The at least one additional power converter is configured to be disposed on the first vehicle. The at least one additional power converter is configured to receive direct current and to output alternating current as at least one additional power output. The first control module is configured to be disposed on the first vehicle and to control timing of the first power converter. The at least one additional control module is configured to be disposed on the first vehicle. The at least one additional control module is associated with the at least one additional power converter and is configured to control timing of the at least one additional power converter. The first control module is configured to communicate first information regarding the timing of the first power converter to the at least one additional control module. The at least one additional control module is configured to adjust the timing of the at least one additional power converter to correspond with the timing of the first power converter. The first control module is configured to communicate control information regarding the timing of the first power converter to at least one additional vehicle for synchronization of at least one power converter of the at least one additional vehicle with the timing of the first power converter.

In another embodiment, a method includes obtaining first information regarding timing of a first power converter disposed on a first vehicle. The method also includes adjusting the timing of a second power converter disposed on the first vehicle to substantially synchronize with the first power converter. Also, the method includes providing control information regarding the timing of the first power converter to at least one additional vehicle. Further, the method includes adjusting the timing of at least one additional power converter disposed on the at least one additional vehicle to substantially synchronize with the first power converter.

BRIEF DESCRIPTION OF THE DRAWINGS

The present inventive subject matter will be better understood from reading the following description of non-limiting embodiments, with reference to the attached drawings, wherein below:

FIG. 5A is a schematic view of one embodiment of an inverter system including a plurality of inverters communicatively connected via a master synchronization line;

FIG. 5B is a schematic view of one embodiment of an inverter system including a plurality of inverters communicatively connected via a slave synchronization line;

FIG. 9b is another schematic diagram of the system of FIG. 9a.

DETAILED DESCRIPTION

Figure 1:
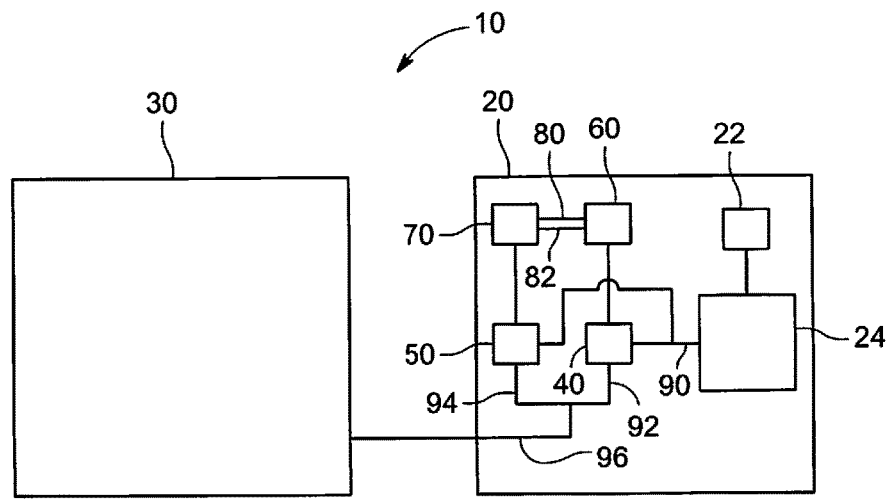
FIG. 1 is a schematic diagram of one embodiment of a head end power (HEP) system including a plurality of inverters.

One or more embodiments of the inventive subject matter described herein provide systems for substantially synchronizing events of two or more inverters. In certain embodiments, for example, the output of a plurality inverters may be synchronized and combined into a combined output provided to one or more receiving units. For example, the outputs of a plurality of inverters receiving power from a DC source of a powered vehicle unit may be synchronized and combined to provide a single AC power source to one or more non-powered vehicle units. Synchronizing the outputs to be combined as discussed below improves the performance and efficiency of such systems. It should be noted that while much of the discussion herein is directed to embodiments that include inverters, other devices are also contemplated. For example, different embodiments may comprise one or more other types of power converters alternatively or additionally to inverters, such as rectifiers, chopper circuits, H-Bridges, and/or IGBT devices.

As used herein, the term "synchronize" (and forms thereof) means that the timing of the plural inverters are coordinated with each other to, for example, substantially coincide, or as another example, to be located substantially at a predetermined phase shift. By way of example, it may be desirable to phase shift a pulse width modulation (PWM) waveform of a master with that of a slave or slaves to reduce total harmonic distortion. The phase shift may be predetermined based on the number of slaves associated with a given master. For example, in systems where one slave is driven by a master, a phase shift of about 180 degrees is used to minimize total harmonic distortion. As another example, in systems where two slaves are driven by the master, a phase shift of about 120 degrees is used to minimize total harmonic distortion. As one more example, in systems where three slaves are driven by the master, a phase shift of about 90 degrees is used to minimize total harmonic distortion. Synchronization of the inverters may result in the combined output of the inverters providing greater electric power than prior to coordination of the inverters. The timing of the outputs can be represented by the times or time periods at which one or more events occur in the inverters. For example, zero crossings, peaks (e.g., the ninety-degree location in a sinusoidal waveform), valleys (e.g., the 270-degree location in a sinusoidal waveform), and other points in sinusoidal waveforms of the outputs may be the events and the times at which these events occur in different outputs may be coordinated. The timing of the events may be coordinated (and the outputs temporally synchronized) by altering one or more of the outputs so that time differences between when the same events occur in different outputs are reduced. As one example, the timing of the events may be coordinated so that the events occur at the same time or within a relatively small designated threshold time period, and the combination of the outputs provides increased electric power (relative to a time before synchronization). For example, two inverters may be synchronized when the zero crossings, peaks, or valleys of the sinusoidal waveforms (e.g., the events) in the inverters occur at the same time (or at the predetermined phase shift), and may be substantially synchronized when the events occur within five degrees, 0.09 radians, or 0.01 wavelengths of the waveforms (or within such ranges of the predetermined phase shift). Alternatively, the outputs may be substantially synchronized when the events occur within 10 degrees, 0.18 radians, or 0.02 wavelengths of the waveforms (or within such ranges of the predetermined phase shift). In another embodiment, other limits may be used to define substantial synchronization. For example, the inverters may be substantially synchronized when the combination of the outputs is increased prior to synchronizing the outputs.

In certain embodiments, as another example, the outputs of the inverters are not combined, but instead are provided to separate receiving units. For example, a plurality of inverters providing power separately to a series of tractive motors generally controlled by a primary control system may be synchronized so that the tractive motors continue to receive power and control in the event that one or more of the tractive motors becomes incapable of adequate communication with the primary control system. Synchronizing the outputs of the inverters in this fashion provides a valuable backup to a primary control system.

Embodiments provide synchronization with no delays compared with current communication protocols which have delays and overhead built into them. Embodiments provide deterministic timing as opposed to current communication protocols that have nondeterministic timing. Embodiments allow synchronization with or without output power over a single wire. For example, in some embodiments, synchronization between first and second power converters may be achieved without output power required as feedback.

FIG. 1 illustrates a schematic view of a head end power (HEP) system 10 formed in accordance with an embodiment of the present inventive subject matter. The HEP system 10, as well as combinations of different portions thereof, provide examples of a multiple inverter system. The depicted HEP system 10 is configured and adapted so that direct current energy supplied by a powered vehicle, for example, a locomotive, may be converted to alternating current energy that may be utilized by an associated non-powered unit, for example, a passenger car. A non-powered unit may be understood as a unit that does not have the capacity to provide all of the power it requires for operation, and instead utilizes power provided from a different unit. Of course, other applications and/or uses are possible, including, for example, other types of vehicles systems or, as another example, other systems where power is provided from a powered source to a non-powered receiving device or system. For example, one or more embodiments described herein may be used with non-rail vehicle systems, such as marine vessels, other off-highway vehicles, and the like.

The HEP system 10 includes a powered unit 20, a non-powered unit 30, a first inverter 40, a second inverter 50, a first control module 60, a second control module 70, and a communication link 80. In one embodiment, the powered unit 20 can represent one or more vehicles (e.g., rail vehicles) capable of self-propulsion, such as one or more locomotives, and/or the non-powered unit 30 can represent one or more vehicles that are connected or interconnected with the powered unit 20 (e.g., in a consist) and that are incapable of self-propulsion. The term "non-powered," however, does not exclude the non-powered unit 30 from including one or more electric loads disposed onboard the non-powered unit 30. For example, while the non-powered unit 30 may not include a traction system (e.g., one or more traction motors) that propels the non-powered unit 30, the non-powered unit 30 may include electric loads that provide non-propulsion services, such as refrigeration, lighting, other climate control, and the like. The first control module 60, second control module 70, and communication link 80 may also be understood be components of an inverter control system 90. The first inverter 40 and second inverter 50 (under the control of the first control module 60 and the second control module 70, respectively) receive DC power from a power source on the powered unit 20, convert the DC power to AC power, and output the AC power to the non-powered unit 30. The first control module 60 acts to control the first inverter 40 and the second control module 70 acts to control the second inverter 50, with communication link 80 communicatively coupling the first control module 60 with the second control module 70.

The depicted powered unit 20 includes a prime mover 22 and a power source 24. The prime mover 22 provides energy which is used to provide a voltage in the power source 24. For example, the prime mover 22 may include one or more engines (e.g., diesel engines or other types of engines) whose output is used to charge the power source 24 via a generator. The power source 24, for example, may in certain embodiments include a battery bank comprised of a number of batteries. The power source 24, in turn, provides direct current energy. Other arrangements of power sources 24, including prime movers, batteries, and/or other power sources are possible. For example, power may be provided by a hybrid system that includes the collection of energy from activities such as regenerative braking. Or, as another example, power may be provided from the generator to the inverters and/or other portions of the vehicle system. As but one more example, an external source may be used to charge the batteries and/or provide electric current, such as powered rails, catenaries, and the like. The power source 24 may represent one or more sources of current, with the sources being the same type (e.g., batteries or generators or external sources) or different types (e.g., batteries and a generator).

The non-powered unit 30 provides an example of an energy receiving unit. The non-powered unit 30 receives electrical energy via an alternating current from the first inverter 40 and second inverter 50. The received alternating current energy may be utilized to power, for example, lighting for a passenger compartment of the non-powered unit 30. The received energy may be used alternatively or additionally for other purposes, such as heating, cooling, and/or to provide electrical energy at outlets for use for passenger conveniences or necessities. Further, additional energy receiving units may also receive alternating current from one or more inverters. As one example, a freight car for carrying cargo may receive alternating current energy for lighting and/or refrigeration. As another example, portions of a powered unit, such as a locomotive, may use alternating current energy provided by an inverter system for powering tractive motors used to propel the locomotive along a track. Thus, one or more receiving units may receive alternating current from the battery (or other source) via one or more inverter systems. In one embodiment, the current received by the non-powered unit 30 from the lead powered unit 20 is used for purposes other than propulsion. For example, the non-powered unit 30 may not consume the current from the powered unit 20 in order to power one or more motors or other systems that propel the non-powered unit 30 along a route.

In the illustrated embodiment, the HEP system 10 may be disposed or dispersed among (e.g., located on or among) a single powered unit 20 and a single non-powered unit 30. However, as also indicated above, different numbers and/or types of powered and/or non-powered vehicles may be employed in additional embodiments. Certain embodiments, for example, may provide alternating current to portions of a powered vehicle itself. Similarly, a vehicle or other system may employ a plurality of inverter systems to provide alternating current to different portions of a system. For example, in certain embodiments, one or more inverter systems could be used to provide power to passenger cars of a vehicle system via a HEP arrangement, while one or more additional inverter systems could be used to provide power to tractive motors to propel the vehicle system.

The first inverter 40 is configured to receive a direct current output of the power source 24 and produce, utilizing the direct current input, an alternating current output 92 to a receiving unit, such as the non-powered unit 30 and/or one or more loads on the non-powered unit 30. For example, direct current may be received from a power bus 90. For certain applications, however, one inverter, either for availability or practicality reasons, for example, may not be sufficient to supply the required power needed from the alternating current. Thus, one or more additional inverters, such as second inverter 50 may be required.

The second inverter 50, similar to the first inverter 40, is configured to receive a direct current output of the power source 24. In the illustrated embodiment, the second inverter 50, utilizing the direct current input received from the power source 24, provides an alternating current output 94 to a receiving unit, such as the non-powered unit 30 and/or one or more loads on the non-powered unit 30. For example, direct current may be received by one or more inverters from a power bus 90. To provide an alternating current of greater energy than could be provided by a single inverter, the output 92 of the first inverter 40 and the output 94 of the second inverter 50 are combined to produce a combination output 96. In alternative embodiments, output from more than two inverters may be combined to provide a combination output. As discussed above, in different embodiments, direct current could be received from a different source, and/or alternating current provided to separate receiving units.

Without an appropriate control system, the combination output 96 may not provide the desired power, and/or may provide the power in an undesirable, inefficient manner. For example, the first inverter 40 and second inverter 50 may, without appropriate control, produce unsynchronized power outputs 92, 94, resulting in interference, noise, cancellation, and/or otherwise reduced performance for combination output 96 and/or associated systems receiving combination output 96.

Figure 2:
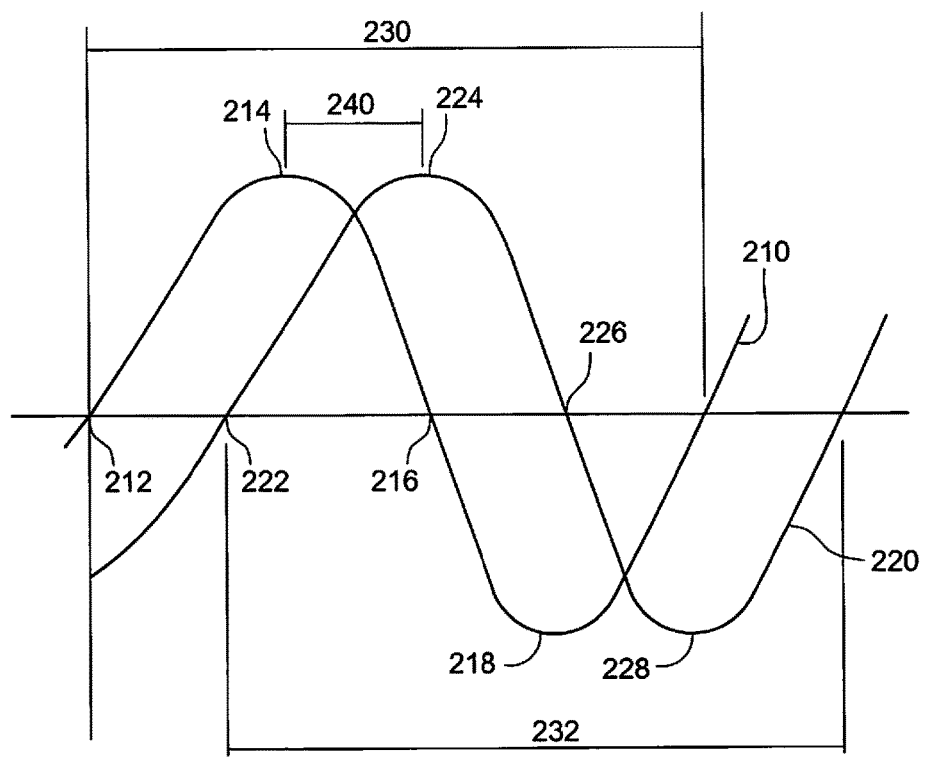
FIG. 2 is a diagram of two unsynchronized output waves.

For example, FIG. 2 illustrates two unsynchronized power output waves, namely, a first output wave 210, and a second output wave 220. The first output wave 210 and second output wave 220 may correspond to, for example, voltage, or, as another example, current. FIG. 2 depicts each of the waves as sinusoidal waves. The first output wave 210 has a first zero crossing 212, an upper peak 214, a second zero crossing 216, and a lower peak 218. The second output wave 220 has a first zero crossing 222, an upper peak 224, a second zero crossing 226, and a lower peak 228. The first output wave 210 and second wave 218 are periodic and repeat using substantially the same timing. The first output wave 210 has a period 230, and the second output wave has a period 232. In FIG. 2, the two waves have substantially the same period length for periods 230 and 232. Also, in FIG. 2, the two waves have substantially similar shapes and amplitudes as observed along their respective periods. Thus, each event in the waves is separated by a delta time 240 that is substantially the same between respective events. In FIG. 2, a delta time 240 is shown between the respective upper peaks 214, 224, but a similar delta time could be measured or shown between other respective events of the two waves.

By adjusting the timing of the events of one of the waves properly, the delta time becomes lower and lower, with the two waves being substantially synchronized once the delta time 240 is satisfactorily low. Further still, in the event the periods of the output waves differ substantially, information regarding the period of a wave may be communicated between the modules, with the output of one inverter adjusted so that the period of the output of that inverter substantially matches the period of the output of a different inverter. In other embodiments, the delta time of two given waves based on a given event of the waves may be controlled to provide a pre-determined desired phase shift.

The first control module 60 acts to control the first inverter 40. In the depicted embodiment, the first control module 60 is configured to gather information from the first inverter 40 regarding, for example, the output of the first inverter 40. For example, the first control module 60 may gather timing information from the first inverter 40. The timing information may include information regarding the characteristics of a wave describing or representative of the alternating current output of the first inverter 40. Such timing information may include, for example, the period of the output, the amplitude of the output, events (such as upper and lower peaks of the output, zero crossings, and/or the times or time periods at which such events, amplitudes, and the like, occur. Different events and/or groups of events may be used in various embodiments. Additionally or alternatively, the information may regard events that are not associated with the power output.

Further still, in the illustrated embodiment, the first control module 60 is further configured to produce a communication stream sent via the communication link 80 to the second control module. The communication stream, for example, comprises a series of pulses alternating between about 0 and about 5 volts. The series of pulses are produced responsive to events in the output of the first inverter 40. For example, pulses may be used as a sort of code to represent upper and lower peaks of the output, or as another example, to represent a zero crossing of a voltage of a filter associated with the first control module. Information collected by one or more control modules and passed to other modules may include, output timing information, fundamental voltage and/or phase information, run status information, fault status information, switching frequency information, and/or fundamental current and/or phase information.

By encoding information about the timing of the output of the first inverter 40 in a synchronization signal (for example, a series of pulses), the first control module 60 can pass information about the output of the first inverter 40 to the second control module 70, thereby facilitating the adjustment of the output of the second inverter 50 by the second control module 70 to substantially synchronize with the output of the first inverter 40. Synchronization may be accomplished, by example, by synchronizing to a rising edge, a falling edge, a rising glitch, or a falling glitch of a synchronization signal. In certain embodiments, the first control module 60 is further configured to receive information, for example from the second control module 70. The first control module 60 may then utilize the received information to control, for example, the timing of the output of the first inverter 40.

In certain embodiments, the first inverter and second inverter and their associated control modules are arranged in a master and slave arrangement. In such an arrangement, the master, or first inverter, is used to determine the timing of the slave, or second inverter. Further, the slave may send back information regarding timing of the output from the slave to the master. The information that is communicated between the master and the slave may be used to confirm that the two inverter outputs have been substantially synchronized, and/or to adjust the output of the first inverter to substantially synchronize with the output of the second inverter. Further still, the arrangement need not be limited to one master and one slave. A number of inverters could be used, with one serving as the master and the rest functioning as slaves. Yet further still, the master may be, for example, arbitrarily selected from a plurality of inverters, or, as another example, selected based on the ability of the others to synchronize to it. In another embodiment, several groups of inverters may be formed or arranged, with each group having a sub-master inverter and the other inverters in the same group being sub-slaves. The sub-slaves in each group communicate and coordinate with the sub-master of the group, and the sub-master inverters of several groups communicate and coordinate with each other and/or a single master inverter.

The second control module 70 acts to control the second inverter 50. The second control module 70 is also configured to gather information from the second inverter 50 regarding, for example, the output of the second inverter 50. The timing information may include information regarding the characteristics of a wave describing the alternating current output of the second inverter 50. Such timing information may include, for example, the period of the output, the amplitude of the output, and events, such as upper and lower peaks of the output. Further still, in the illustrated embodiment, the second control module 70 is further configured to receive the communication stream sent from the first control module 60 via the communication link 80 to the second control module 70. The second control module 70 is configured to use the received information to adjust the timing of the output of the second inverter 50, as appropriate, to substantially synchronize with the output of the first inverter 40, based on the received information.

Similarly, the second control module 70 may further be configured to produce a synchronization signal corresponding to the output of the second inverter 50, and to send the synchronization signal containing timing information about the output of the second inverter 50 to the first control module 60. This information may be used, for example, to confirm that the timing of the two inverters are substantially synchronized, and/or to use the information to adjust the timing of the output of the first inverter 40 to match the timing of the second inverter 50, for example, if the second control module 70 was unable to substantially synchronize the output of the second inverter 50 with the output of the first inverter 40. As indicated above, further inverters and associated control modules may be added to the first and second inverters to provide a system substantially synchronizing an additional number of inverters.

Generally speaking, in embodiments, the master sends a pulse to the slave, and the slave captures the event. The slave may capture the event in real time and/or may capture its own internal event. Such events may include, by way of example, a zero crossing, an event of a PWM waveform, and/or an IGBT firing event. The slave is then adjusted, for example, to reduce Total Harmonic Distortion.

In certain embodiments, for example, the first and second control modules may comprise Field Programmable Gate Arrays (FPGAs) that are operatively connected via connections between their I/O (input/output) pins or pads. The FPGA recognizes events, for example, by capturing transitions occurring in a waveform of the FPGA. Each FPGA may send and receive a serial stream on two separate I/O (input/output) pins of the FPGA. Other types or configurations of modules may be used in other embodiments. An FPGA, as part of a control module, may transmit a pulse train on a synchronization line and receive a pulse train from a second synchronization line. Information may be shared between multiple modules this way. For example, 23 bits of time stamp, using an about 2 MHz clock, may be provided. Information regarding latched rising edge counts and/or latched falling edge counts may also be shared.

In certain embodiments, software associated with the modules is programmed to read the registers to determine timing. For example, 1 bit, sampled at a software programmable time, may be used for a synchronization pulse. Further, an FPGA may sample an incoming synchronization signal using an about 2 MHz clock. The FPGA can check, at a software programmed synchronization pulse check time, if the synchronization pulse has occurred, and, if a pulse is detected, a synchronization bit can be set in a readback register. Software associated with the FPGA is programmed to recognize the represented events, such as, for example, zero crossings and/or peak firing. Thus, an FPGA associated with a slave inverter can sample an incoming signal using an internal clock, with software calculating the delta time to determine when to fire in order to be synchronized with the master inverter. Software can also check the synchronization pulse check time, and the FPGA can check to see if the sync pulse has occurred.

The communication link 80 joins the first control module 60 and second control module 70 communicatively, allowing information to be passed between the two control modules. In the illustrated embodiment, the communication link 80 is depicted as a single wire. For example, the link 80 may be embodied in a single, elongated, conductive body that extends between the first control module 60 and the second control module 70. However, other arrangements are possible. For example, one link (e.g., wire) may be used for communications from a master to a slave, and another link (e.g., wire) used for slave to master communications. Further, more than two inverters and associated modules may be used in connection with embodiments of the present inventive subject matter.

Figure 3:
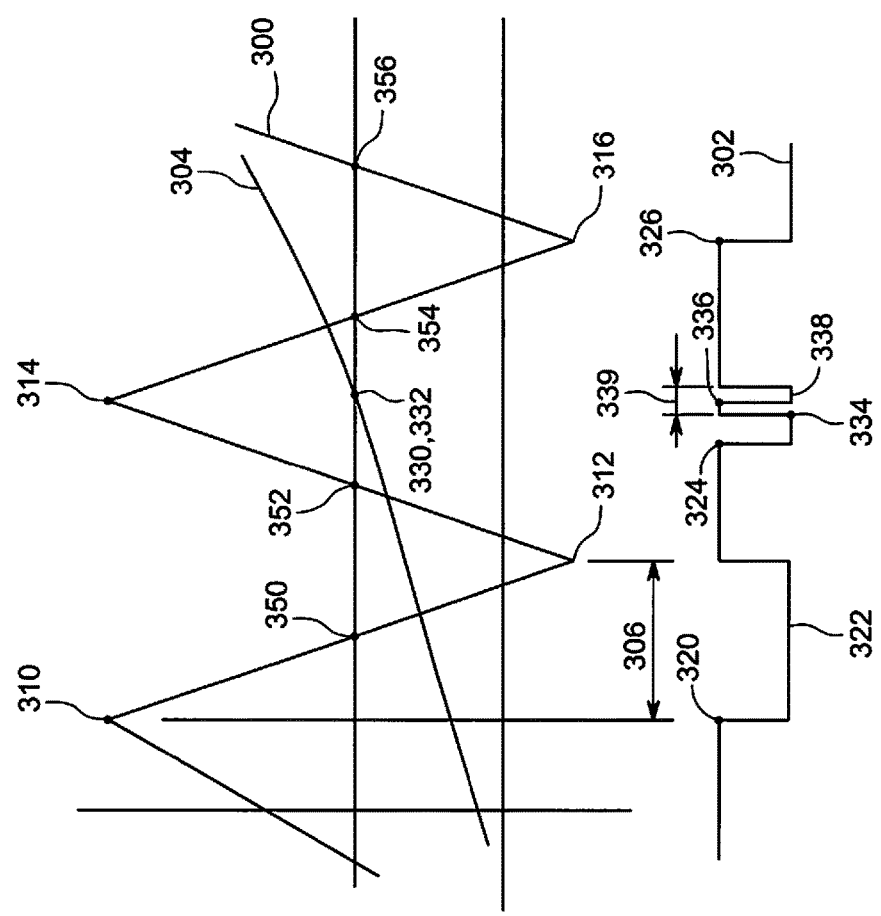
FIG. 3 illustrates an example of a wave with certain events identified by pulses on a corresponding synchronization signal, in accordance with an embodiment of the present inventive subject matter.

In the depicted embodiment, the synchronization signals sent between the control modules use pulses to describe output waves of the inverters. For example, FIG. 3 depicts an example wave 300 (in the depicted embodiment, a triangle wave, however other embodiments may utilize different waveforms or other modulation techniques) with certain events identified by pulses on a corresponding synchronization signal 302. In FIG. 3, wave 300, may be for example, a PWM wave associated with an inverter or other power converter, or a wave representing switching frequencies. The synchronization signal 302, for example, may include pulses that alternate between high and low. For example, the synchronization signal may alternate between an amplitude of about 5 volts for high and about 0 volts for low. A second wave 304 is also depicted. The second wave 304 may correspond, for example, to a fundamental voltage or filter output. The wave 300 includes certain events associated with PWM timing, each of which is represented on the synchronization signal 302 as well. In FIG. 3, the wave 300 includes a first event 310 (in the depicted wave 300, a first upper peak), a second event 312 (in the depicted wave 300, a first lower peak), a third event 314 (in the depicted wave 300, a second upper peak), and a and fourth event 316 (in the depicted wave 300, a second lower peak). The wave 300 also includes zero crossings 350, 352, 354, 356.

The synchronization signal 302 includes a corresponding first point 320 (a move from high to low corresponding to the first event 310), a second point 322 (a move from low to high corresponding to the a second event 312), a third point 324 (a move from high to low corresponding to the third event 314), and a fourth point 326 (a move from high to low corresponding to the fourth event 316). The differences between upper and lower peaks of wave 300 may be identified as a time 306. For wave 300, the time 306 is substantially repeated. For example, time 306 may be about 1000 microseconds. This timing may be utilized by appropriately programmed software to identify the various portions of wave 300. Thus, a synchronization signal according to embodiments of the present inventive subject matter may include pulses that provide information regarding and corresponding to the period, or a fraction or portion thereof, as well as to events of a wave associated with a given inverter.

Representation of such peaks as discussed above is but one example of the identification of events in a synchronization signal. In the illustrated embodiment, the zero crossings 350, 352, 354, 356 are not represented by corresponding points in the synchronization signal, but in other embodiments the zero crossings could be represented additionally or alternatively to the above described events. Generally speaking, any events or points along a given wave may be used in different embodiments to provide information for synchronization.

The synchronization signal 302 may also comprise information regarding other events, such as events of the second wave 304. For example, the second wave 304 may have a zero crossing 330 at point 332. This is represented in the sync line by move from low to high at 334 followed relatively quickly by a move from high to low at 336 and a move from low to high at 338. The time 339 between pulses 334 and 338 may, for example, be about 10 microseconds. This provides a type of signature on the sync signal 302 that may be identified by software of a module receiving such a signal as corresponding to a zero voltage crossing. By using such a synchronization signal depicting events of a wave, one module may communicate to another module the timing events of its associated inverter, allowing the second module to check if its associated inverter is substantially synchronized, and to make appropriate adjustments if not. Of course, other types of events may be represented, and/or other patterns of pulses may be used to identify the events. For example, events from more than one wave may be used to determine and adjust timing. As one example, information regarding the relationship between an event in one wave, for example, third event 314 of the wave 300 and zero crossing 330 of the second wave 304 may be shared and used to synchronize two inverters.

Thus, the first control module 60 sends a timing information signal containing timing information about the first inverter 40 to the second control module 70. The second control module 70 then uses the information provided by the timing information signal to alter the timing of the second inverter 50 to substantially synchronize to the timing of the first inverter 40. With the inverters substantially synchronized, an improved combination output 96 is provided to the receiving unit or units.

In certain embodiments, a feedback line 82 may be provided to facilitate the sending of timing information regarding the second inverter (e.g., slave) to the control module of the first inverter (e.g., master). Thus, the first inverter may evaluate or confirm if the timing of the two inverters has become substantially synchronized. Further, if for some reason the second inverter is unable to be substantially synchronized with the first inverter, the first control module may use the received information about the output of the second inverter to adjust the first inverter to substantially synchronize with the second inverter. The feedback line 82 may be embodied in a separate communication link than the link 80. For example, the feedback line 82 may include a single wire that is separate from the link 80. Alternatively, the line 82 may be included in the link 80. For example, the feedback line 82 may represent a communication path through the link 80.

Figure 4:
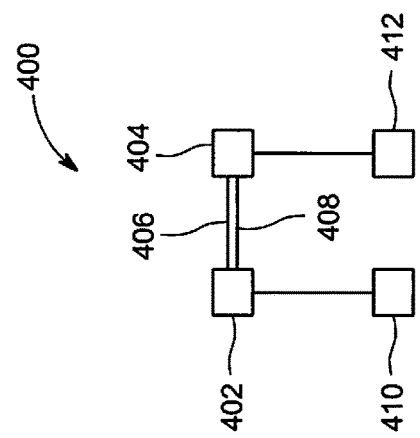
FIG. 4 is a schematic diagram of one embodiment of a control system including a plurality of inverters.

FIG. 4 provides an example of a control system 400 comprising a first control module 402 and a second control module 404 communicatively coupled by a first line 406 and a second line 408. The first control module 402 controls a first inverter 410, and the second control module 404 controls a second inverter 412. In the illustrated embodiment, the first inverter 410 is configured as a master and the second inverter 412 is configured as a slave. The first line 406 is a main line providing a path for information about the master inverter from the first control module 402 to the second control module 404. The second line 408 provides a feedback link providing a path for information about the slave inverter from the second control module 404 to the first control module 402. For the above discussion, more than one "line" may not necessarily require distinct physical components. For example, in certain embodiments, a single wire may provide both the first and second lines.

The control system 400 may perform generally similar to aspects of the above description. If, in the system 400, the second control module 404 and/or the first control module 402 (for example, based on information provided via the second line 408) determines that that the second control module 404 cannot adjust the timing of the second inverter 412 to substantially synchronize with the first inverter 410 utilizing the information provided by the first control module (or cannot substantially synchronize within a predetermined time limit), then the first control module 402 uses information about the second inverter 412 provided via the second line 408 to substantially synchronize the first inverter 410 to the output of the second inverter 412. Thus, the information provided to the first control module 402 from the second control module 404 may be used, for example, by the first control module 402 to confirm that the second control module 404 was able to substantially synchronize the second inverter 412 and/or to allow the first control module 402 to adjust the first inverter 410 to substantially synchronize with the second inverter 412.

Further still, in other embodiments, both the master and slave inverter may progressively, or iteratively, adjust to each other to achieve substantial synchronization. Again, as above, additional inverters and control modules may be used so that more than two inverters may be synchronized in alternative embodiments.

FIGS. 5A and 5B provide schematic views of an inverter system 500 comprising a plurality of inverters. In the depicted embodiments, the inverter system 500 includes a first inverter 502, a second inverter 504, a third inverter 506, a fourth inverter 508, a fifth inverter 510, and a sixth inverter 512. FIG. 5A provides a schematic view of the inverter system 500, showing connections between the various inverters along a master synchronization line 520. In FIGS. 5A and 5B, a solid line indicates a line along which a signal is being sent in a given direction, and a dashed line a line along which no signal is being sent. FIG. 5A shows the sending (above the master synchronization line 520) and receiving (below the master synchronization line 520) of a master synchronization signal. The master synchronization signal may include, for example, timing information as described above relating to a master inverter. In FIG. 5A, the fifth inverter 510 is functioning as the master, and the first inverter 502, fourth inverter 508, and the sixth inverter 512 are function as slave inverters.

FIG. 5B provides a schematic view of the inverter system 500, showing connections between the various inverters along a slave synchronization, or feedback, line 530. FIG. 5B shows the sending (above the slave synchronization line 530) and receiving (below the slave synchronization line 530) of a slave synchronization signal. The slave synchronization signal may include, for example, timing information as described above relating to a slave inverter. Here, the sixth inverter 512 is acting as the master with respect to the slave synchronization line 530, and the first inverter 502, third inverter 506, and fifth inverter 510 are acting as slave inverters with respect to the slave synchronization line 530. In embodiments of systems comprising a plurality of inverters such as system 500, any single inverter could assume the master role for any given synchronization line, and any number of inverters could take on the slave role for any given synchronization line.

Figure 6:
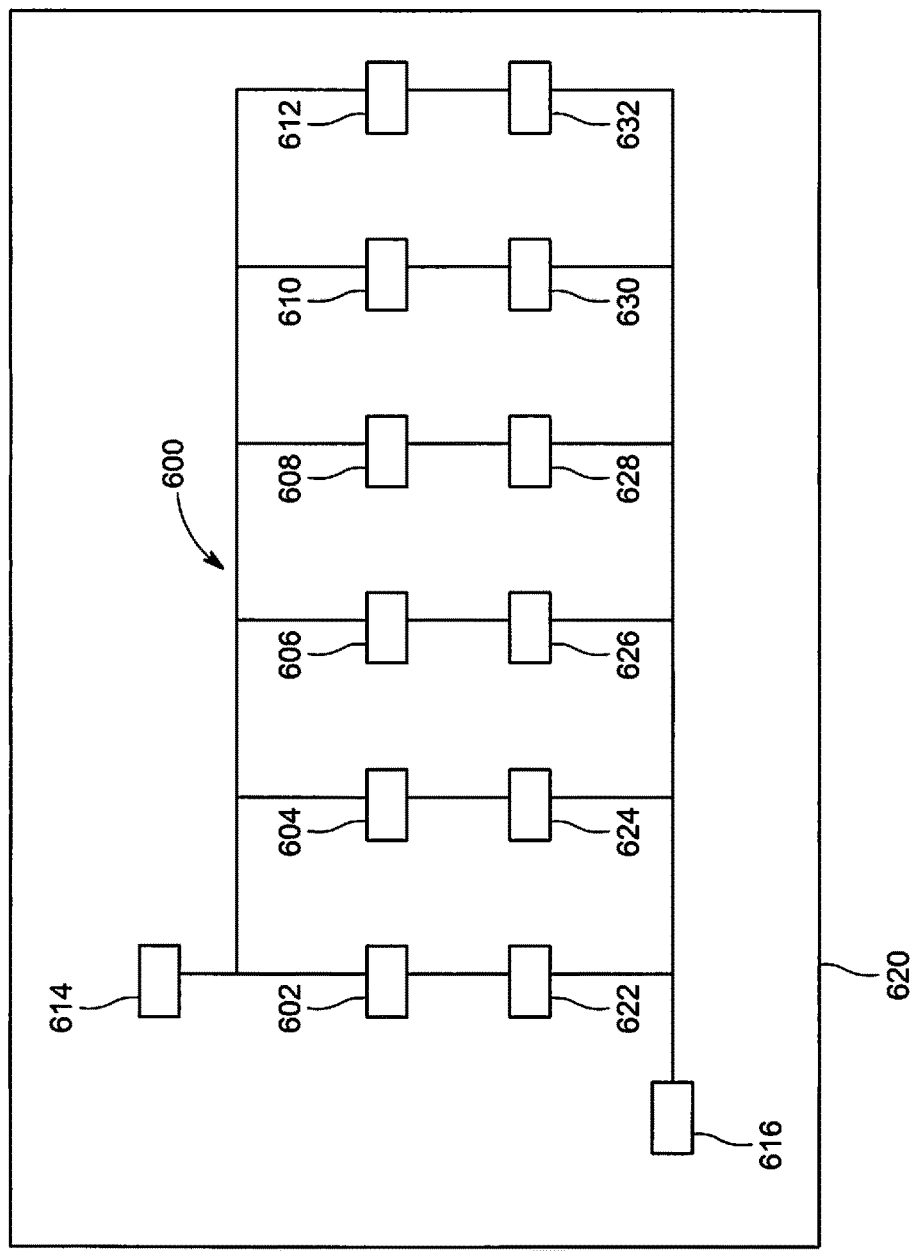
FIG. 6 is a schematic diagram of one embodiment of an inverter control system associated with tractive motors and corresponding axles.

The above discussed system 100 (see FIG. 1) provides an example of an embodiment in which the outputs of inverters of an inverter system are combined into a single output. Other embodiments of the present inventive subject matter provide systems where the outputs of first and second (and/or additional) inverters are not combined and instead provide power to different receiving units. An example of such a system is provided in FIG. 6, which provides a schematic view of an inverter system 600. The inverter system 600 includes first inverter module 602, second inverter module 604, third inverter module 606, fourth inverter module 608, fifth inverter module 610, and sixth inverter module 612. For the following discussion of system 600, the inverter modules are described for ease of understanding as including both an inverter and an inverter control module. In practice, one or more inverters and associated control modules could be physically separate components. The inverter system 600 of the illustrated embodiment is configured for use with a powered unit 620 having independently powered and controlled axles including first axle 622, second axle 624, third axle 626, fourth axle 628, fifth axle 630, and sixth axle 632. For example, the powered unit 620 may be a locomotive, other rail vehicle, or another type of vehicle (e.g., an automobile, marine vessel, mining vehicle, or other off-highway vehicle). In FIG. 6, each axle may be understood as including a corresponding tractive motor for turning the axle to help propel the powered unit 620. The respective inverter modules receive power from a DC source, such as a power source 624 (for example, a generator associated with a prime mover (not shown), a battery, an off-board or external source, and the like), and provide alternating current to tractive motors associated the corresponding axles as indicated in FIG. 6.

The powered unit 620 is configured so that the axles generally are controlled via a connection to a primary control system 616, which controls the tractive motors corresponding with each axle. In the embodiment depicted in FIG. 6, the output of each inverter module is provided to a specific motor and axle, and the outputs of the respective inverters are not added.

An interruption or fault in normal operation may occur, preventing proper communication between the primary control system 616 and one or more inverter module/motor/axle combinations. This can result the affected one or more axles being effectively shut down. In the event the motor/axle combination is still functional and is shut down solely as a result of loss of adequate communication with the primary control system 616, the affected axle or axles may be prevented from being shut down by back-up control being provided by one or more of the unaffected inverter modules. This information could be provided via a line or lines between the inverter modules generally similar to the above discussion. The information shared between inverters could include, for example, information as discussed above, or, for example, information regarding a torque command, a fault status, the speed of the powered unit 610, a notch setting corresponding to the desired speed and/or tractive effort of the powered unit 610, and/or status information of an axle. The affected axle may then be controlled to correspond to the axle for which information is being provided. For example, the affected axle may be controlled by its associated inverter module to substantially match the setting used for the unaffected axle providing information. Thus, while the inverter system 600 may only have the capability to provide a limited amount of information relative to a primary control system, the inverter system 600 may act to provide a backup with more limited capability to an existing primary control system. When a primary control system fails to communicate with one or more separate powered units, such an inverter system may step in to share information between separate powered units that are still receiving commands from the primary control system with those powered units that are not still receiving commands from the primary control system.

Embodiments of the present inventive subject matter may include multiple inverter systems of similar and/or different configurations. For example, a system may include a HEP inverter system along with one or more inverter systems for controlling axles of a powered vehicle.

Systems formed in accordance with embodiments of the present inventive subject matter, such as those embodiments discussed specifically in detail above, thus provide improved synchronization and performance of inverter systems while requiring minimal or reduced additional wires and/or signals, and/or not requiring or including complex and/or expensive communications overhead while avoiding and/or reducing delay, droop, and/or frequency shift. In certain embodiments, only a single wire may be required for synchronization. As used herein, embodiments employing "only a single wire" for synchronization may be understood as employing a conductor configured to contain only a single conductive path within a stand-alone conductive unit. For example, an 8-wire bus, or, as another example, a cable including a plurality of wires, are not configured to contain only a single conductive path within a stand-alone conductive unit. For example, any given individual wire in such a bus or cable would form a portion of the conductive unit, and thus would not provide for synchronization employing "only a single wire."

Figure 7:
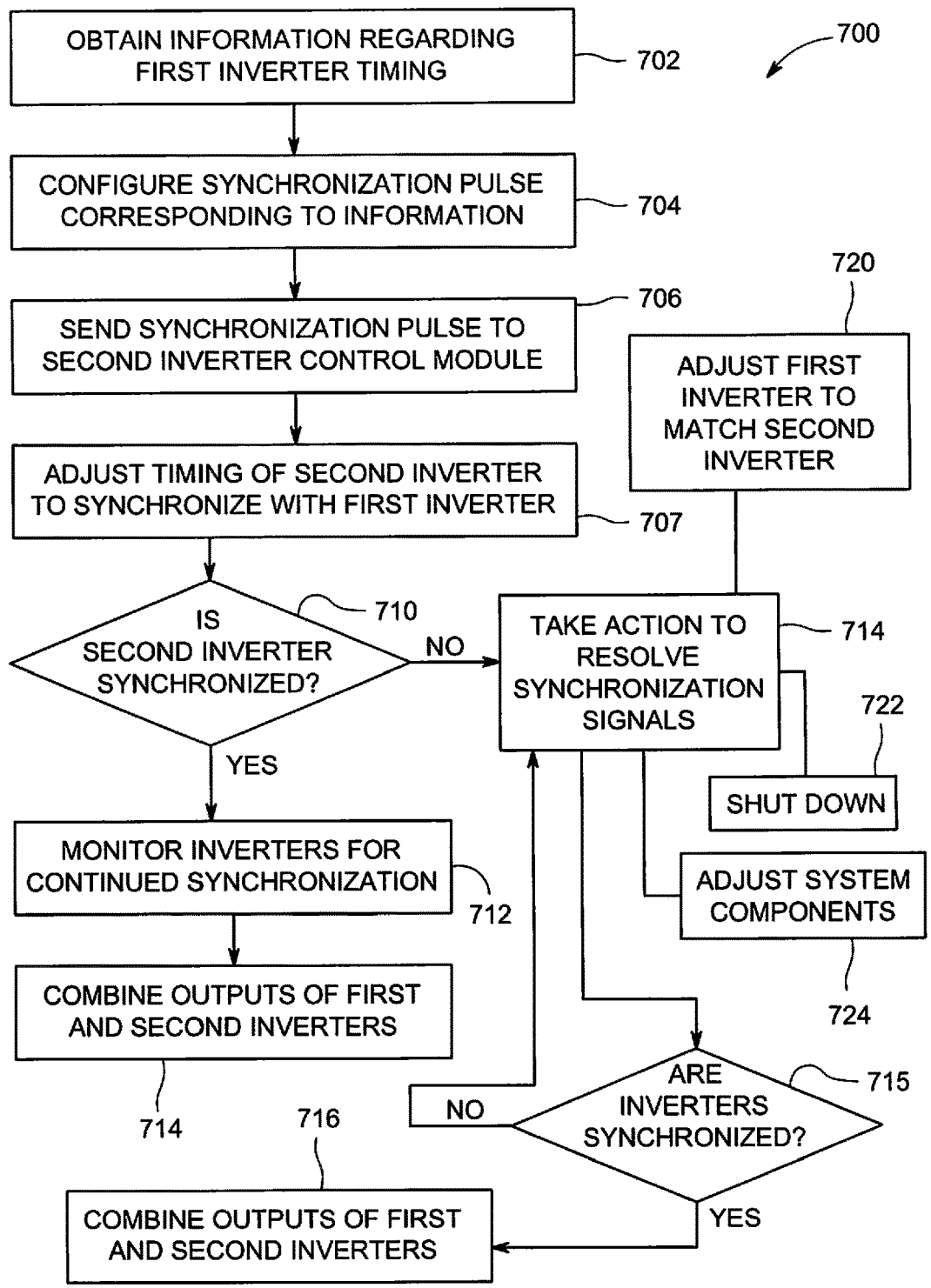
FIG. 7 is a flowchart of one embodiment of a method for controlling the output of a plurality of inverters.

FIG. 7 provides a flowchart depicting a method 700 of controlling an inverter system having a plurality of inverters formed in accordance with an embodiment of the present inventive subject matter. In certain embodiments, certain operations may be added or omitted, certain steps may be performed simultaneously with other steps, certain steps may be performed in different order, and certain steps may be performed more than once, for example, in an iterative fashion. Further, for example, more than two inverters may be synchronized in certain embodiments.

At 702, first information describing the timing of a wave of a first inverter is obtained. The wave may, as one example, be associated with the power output of the first inverter. As another example, the wave may correspond to a PWM waveform of the first inverter. This information could be obtained, for example, by a control module associated with the first inverter that samples the output of the first inverter. For example, as also discussed above, the first information could describe an event or events of a wave (such as upper and/or lower peaks and/or the period) describing an alternating current output of the first inverter. As another example, the first information could describe characteristics of a tractive motor and axle being provided power from the first inverter, such as desired speed, a torque command, a notch setting, and/or other information. In general, the type of information used may be selected based on ease of obtaining and encoding for communication to another inverter or control module in addition to reliability and accuracy.

At 706, the first information that has been obtained regarding the first inverter is communicated to a second inverter control module that is configured to control the output of a second inverter. In the depicted embodiment, at 704, the first information is represented by a synchronization pulse. This information is in the form of a synchronization pulse that is communicated (at 706) from a first control module associated with the first inverter to the second inverter control module. For example, the synchronization pulse can include event pulses that correspond to events in a wave describing the output of the first inverter, as also discussed above.

At 708, the timing of the second inverter is adjusted, responsive to the received first information, to substantially synchronize with the timing of the first inverter. For example, the second control module, which received the first information, may be configured to adjust the timing of the second inverter. In certain embodiments, the inverters are substantially synchronized through an adjustment of the timing of the second inverter such that the timing of the second inverter substantially coincides with the timing of the first inverter, for example, as measured by the timing of the period of the outputs as well as the timing of certain events, such as one or more upper peaks and/or one or more lower peaks. As another example, the inverters may be substantially synchronized by substantially matching a characteristic of motors and/or axles powered by the respective inverters, such as a torque command or notch setting. To avoid possible complications of an overly large adjustment of the timing of events of an inverter, limiters may be applied so that any adjustments are made in appropriately sized steps.

At 710, it is determined whether or not the second control module was successful in adjusting the timing of the second inverter to substantially synchronize with the first inverter. For example, the second control module may obtain information about the timing of the second inverter and compare that information to the first information received regarding the first inverter. If the adjustment was successful, then, for example, at 712, the timing of the inverters may be monitored to confirm continued synchronization and/or make further adjustments in the future as appropriate.

If the second control module was unsuccessful in substantially synchronizing the inverters, then at 714, an action responsive to the unsuccessful adjustment attempt is made. This action may take one or more forms. For example, at step 720, the output of the first inverter is adjusted to substantially synchronize with the output of the second inverter. For example, the second control module may obtain information about the timing of the second inverter, describe that information in a synchronization pulse that can be understood by the first control module, and send the information to the first control module. The first control module than adjusts the timing of the first inverter to substantially synchronize with the second inverter based on the received information. As also discussed above, this adjustment may take place in appropriately sized discreet increments to avoid an overly large change in timing. In certain embodiments, mutual adjustments of more than one inverter may be made back-and-forth in an iterative fashion to substantially synchronize two or more inverters. Additionally or alternatively, for example if the adjustment at 720 is not successfully, at step 722, a shutdown is performed. This shutdown may be of one or more inverters, and may be performed to restart all or a portion of a system to facilitate a renewed attempt at synchronization after the shutdown. For example, if one out of four inverters cannot synchronize, than that particular inverter may be shutdown. In other embodiments, all four may be shutdown and restarted. Further still, at step 724, another action that may be taken is to make adjustments to the operation of a system associated with the unsynchronized inverters to take into account that the inverters are not synchronized. Additionally, a message may be sent to an operator and/or a system informing the recipient that the inverters were not able to synchronize. If, at step 715, the inverters are synchronized, then the method may proceed to step 716. If the inverters are not synchronized, then, the method may return to step 714 for additional or alternative attempts to resolve any synchronization issues.

Further, in certain embodiments, the outputs of the first and second inverters (and, in certain embodiments, further additional inverters) are combined to provide a combined output at 716. In certain embodiments, the output of the first and second inverters (and, in certain embodiments, further additional inverters) are not combined but instead are provided to separate receiving entities. In still other embodiments, the outputs of certain inverters may be combined while the outputs of other inverters are not combined.

In certain embodiments, the outputs of power converters disposed on different vehicles may be used to provide power to one or more additional vehicles. For example, the outputs of power converters disposed on different vehicles may be combined and/or synchronized to provide a combined power output to one or more additional vehicles.

For example, in some embodiments, two powered (or propulsion-generating) vehicles may be used in combination to provide head end power (HEP) for a consist (e.g., power for passenger or non-propulsion-generating vehicles in a consist). In some embodiments, each powered unit has two power converters, such as inverters. (Other numbers of power converters may be used in alternate embodiments.) The two power converters of the first powered unit are synchronized (e.g., substantially synchronized) with one another. When the second powered unit is turned on, the two power converters of the second powered unit are synchronized (e.g., substantially synchronized) with one another. When a HEP system is turned on, the power converters of the second powered unit are synchronized (e.g., substantially synchronized) to the power converters of the first powered unit. Accordingly, if the first powered unit cannot provide a desired amount of power for a consist (e.g., a relatively long vehicle system such as a passenger train), power from a second powered unit may be additionally used to provide the additional power, without requiring an increase in weight of either powered unit to accommodate additional power converters. An example of a power converter system that may be used to provide power from more than one powered vehicle to other vehicles of a consist is provided in FIG. 8.

Figure 8:
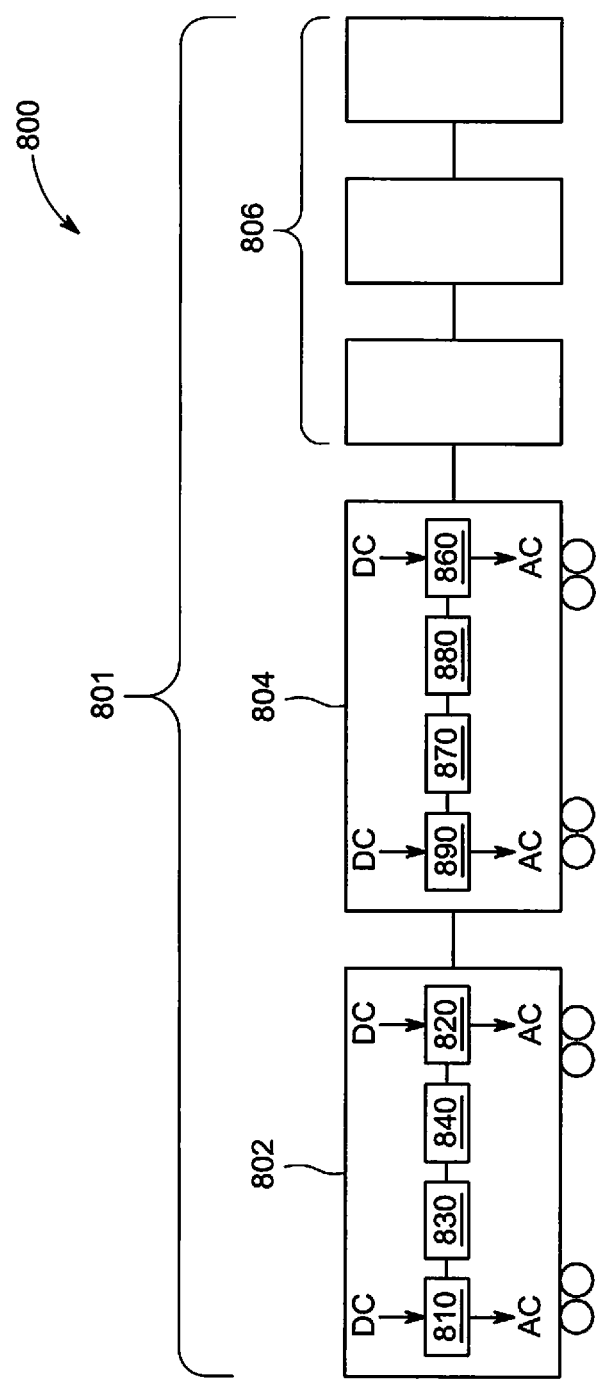
FIG. 8 is a schematic diagram of one embodiment of a power converter control system.

FIG. 8 is a schematic diagram of one embodiment of a power converter control system 800. The power converter control system 800 is configured for use with a consist 801 that includes a first vehicle 802, a second vehicle 804, and non-powered vehicles 806. For example, the first vehicle 802 and second vehicle 804 may be powered rail units (or locomotives), while the non-powered vehicle 806 may be passenger cars.

The depicted power converter control system 800 includes a first power converter 810, a second power converter 820, a first control module 830, and a second control module 840 disposed on the first vehicle 802. The depicted power converter control system 800 also includes a third power converter 850, a fourth power converter 860, a third control module 870, and a fourth control module 880.

As seen in FIG. 1, the first power converter 810 is disposed on the first vehicle 802, receives direct current, and outputs alternating current as a first power output. Similarly, the second power converter 820 is disposed on the first vehicle 802, receives direct current, and outputs alternating current as a first power output. Also, the first control module 830 is disposed on the first vehicle 802 and controls timing of the first power converter 810. The second control module 840 is disposed on the first vehicle 802, and is associated with the second power converter 820. In the illustrated embodiment, the second control module 840 is configured to control the timing of the second power converter 820. The timing of the second power converter 820 may be substantially synchronized with the timing of the first power converter 810. In the illustrated example, the first control module 830 communicates first information regarding the timing of the first power converter 810 to the second control module 840, and the second control module 840 adjusts the timing of the second power converter 820 to correspond with (e.g., be synchronized or substantially synchronized with) the timing of the first power converter 810. Additionally, the depicted first control module 830 communicates control information regarding the timing of the first power converter 810 to the second vehicle 804 for synchronization of at least one power converter (e.g., third power converter 850, fourth power converter 860) with the timing of the first power converter 810.

As also seen in FIG. 1, the third power converter 850 is disposed on the second vehicle 804. The third power converter 850 receives direct current and outputs alternating current as a third power output. Also, the fourth power converter 860 is disposed on the second vehicle 804. The fourth power converter 860 receives direct current and outputs alternating current as a fourth power output. The third control module 870 is disposed on the second vehicle 804, and controls timing of the third power converter 850 using the control information communicated by the first control module 810. Also, the fourth control module 880 is disposed on the second vehicle 804, and controls timing of the fourth power converter 860 using the control information communicated be the first control module 810. It may be noted that the fourth control module 880 may receive the control information indirectly, for example the fourth control module 880 may receive the control information from the third control module 870. Accordingly, the power outputs from the various power converters may by substantially synchronized to each other, and provided to the non-powered units 806. The control modules may be arranged in a master/slave arrangement. For example, the second control module 820 and third control module 870 may be configured as slaves, with the control module 810 as the master. Also, the fourth control module 880 may be configured as a slave, with the third control module 870 as the master. The power converters and control modules of a given vehicle (e.g., first vehicle 802, second vehicle 804) may be arranged generally similarly to the arrangement discussed in connection with FIG. 4 in various embodiments.

It may be noted that the first control module 810 may be configured to communicate the control information in a first mode of operation, but not to communicate the control information in a second mode of operation. For example, the control information may be communicated to the second vehicle 804 (e.g., the third control module 870 disposed onboard the second vehicle 804) when the first vehicle 802 is operated in a HEP mode of operation. The output from the power converters of the first vehicle 802 and the second vehicle 804 may be synchronized to provide power to the non-powered units 806. Further still, in some embodiments, the control information may only be communicated in a HEP mode of operation for which the power from the power converters onboard the first vehicle 802 (in the illustrated embodiment, the first power converter 810 and the second power converter 820) is not sufficient to provide a desired amount of power to the non-powered units 806.

As discussed herein, master/slave arrangements may be employed both between different propulsion-generating or powered vehicles and on-board the same propulsion-generating or powered vehicle in various embodiments. For instance, in one example scenario, a consist includes two propulsion-generating vehicles. Communication between the two propulsion-generating vehicles is accomplished via two lines—one for command and one for feedback. The lead vehicle master may provide the command to the trail vehicle master, with the lead vehicle receiving feedback from the trail vehicle. As one example of a command, a switching may be commanded at the zero crossings of a fundamental. Within each propulsion generating vehicle, there may also be a master and slave with two wire communications. The master may provide commands for synchronization with the slave, with the slave providing feedback to the master.

Figure 9A:
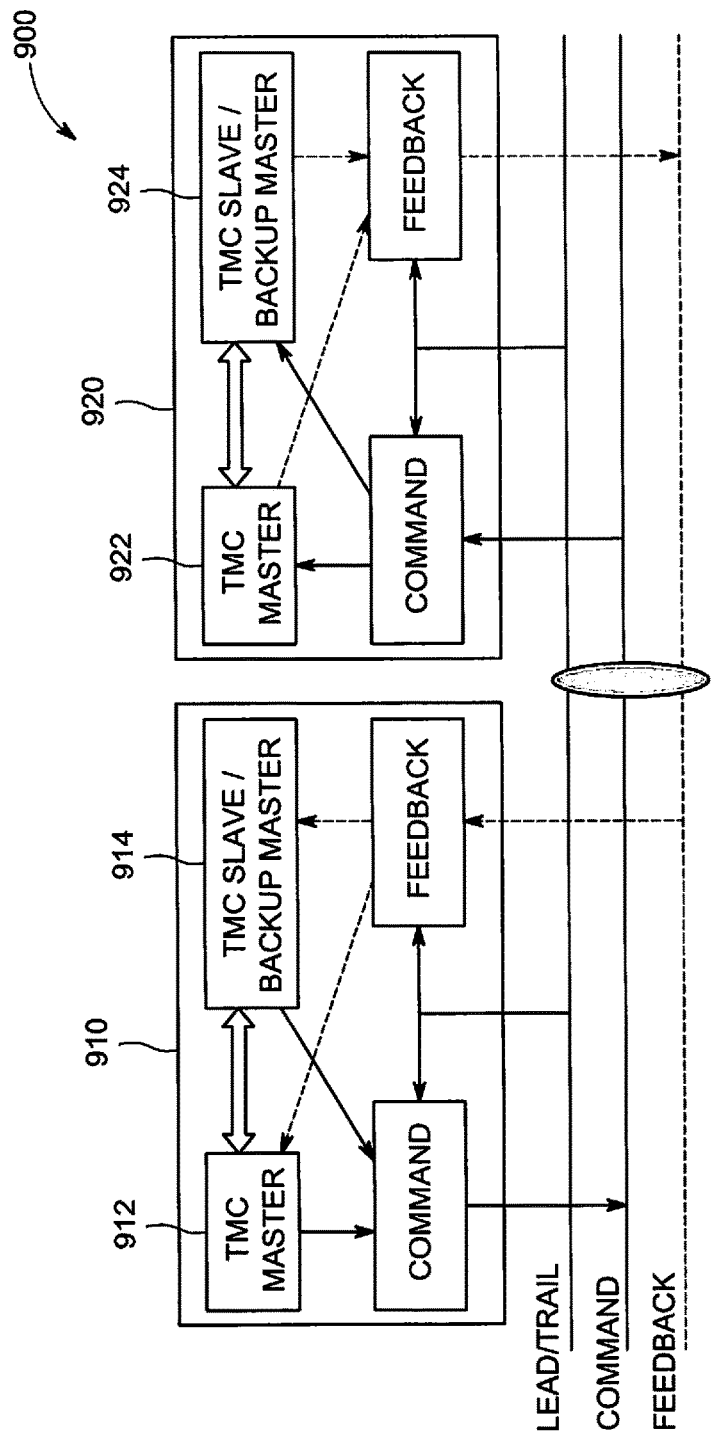
FIG. 9a is a schematic diagram of an embodiment of a power converter control system.

FIG. 9a is a schematic diagram of a consist 900 where a lead vehicle is configured as the master, and a trail vehicle as a slave (relative to the lead vehicle). The consist 900 includes a lead vehicle 910 and a trail vehicle 920. The lead vehicle 910 includes a first processor 912 (which controls a first power converter) and a second processor 914 (which controls a second power converter). The first processor 912 is configured as a master, and the second processor 914 is configured as a slave (relative to the first processor 912). The second processor 914 may also be configured as a back-up master. The trail vehicle 920 includes a third processor 922 (which controls a third power converter) and a fourth processor 924 (which controls a fourth power converter). The third processor 922 is configured as a master, and the fourth processor 924 is configured as a slave (relative to the third processor 922). The fourth processor 924 may also be configured as a back-up master.

As seen in FIG. 9a, a command is sent from the lead vehicle 910 (e.g., first processor 912 or second processor 914) to the trail vehicle 920 (e.g., third processor 922 and/or fourth processor 924). Also, feedback is provided from the trail vehicle 920 to the lead vehicle 910.

Figure 9B:
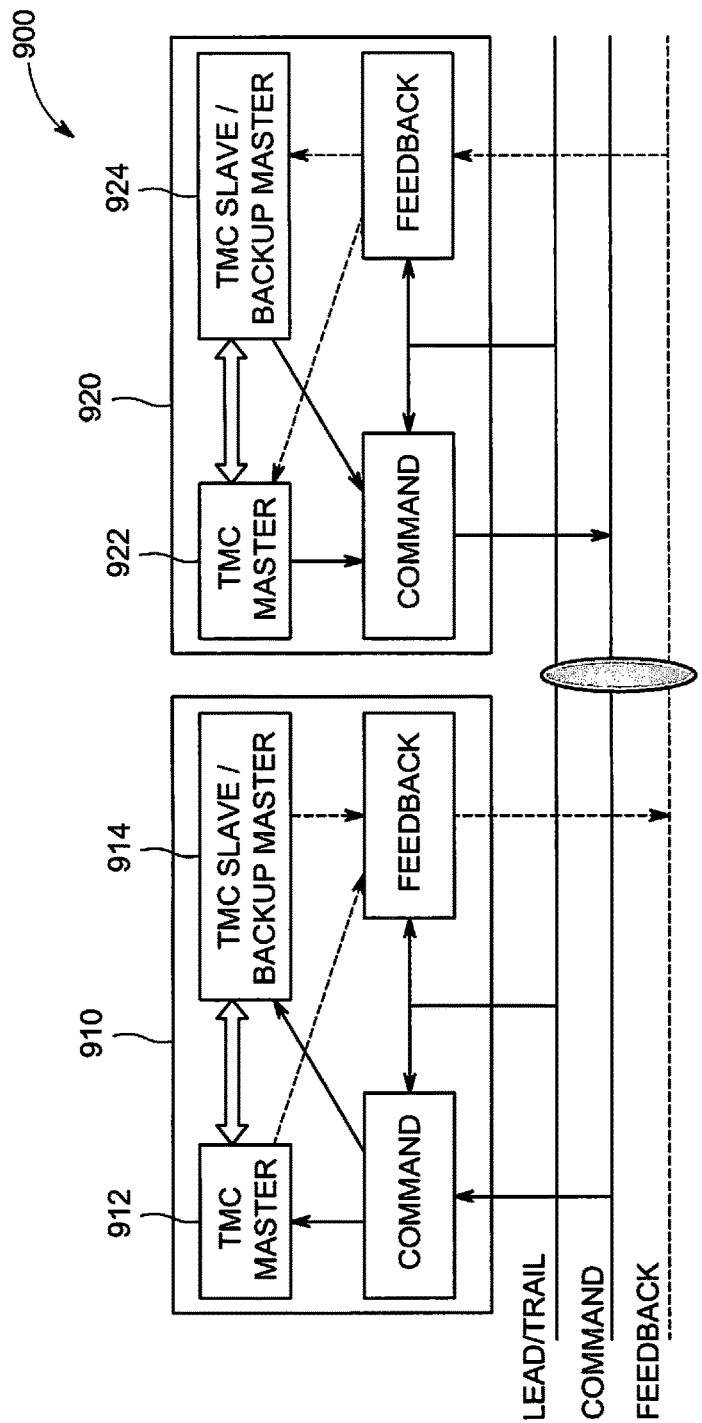

FIG. 9b is a schematic diagram of the consist 900 where the trail vehicle 920 is configured as the master, and the lead vehicle 910 is configured as a slave (relative to the trail vehicle 920). As seen in FIG. 9b, a command is sent from the trail vehicle 920 (e.g., third processor 922 or fourth processor 924) to the lead vehicle 910 (e.g., first processor 912 and/or third processor 914). Also, feedback is provided from the lead vehicle 910 to the trail vehicle 920.

Figure 10:
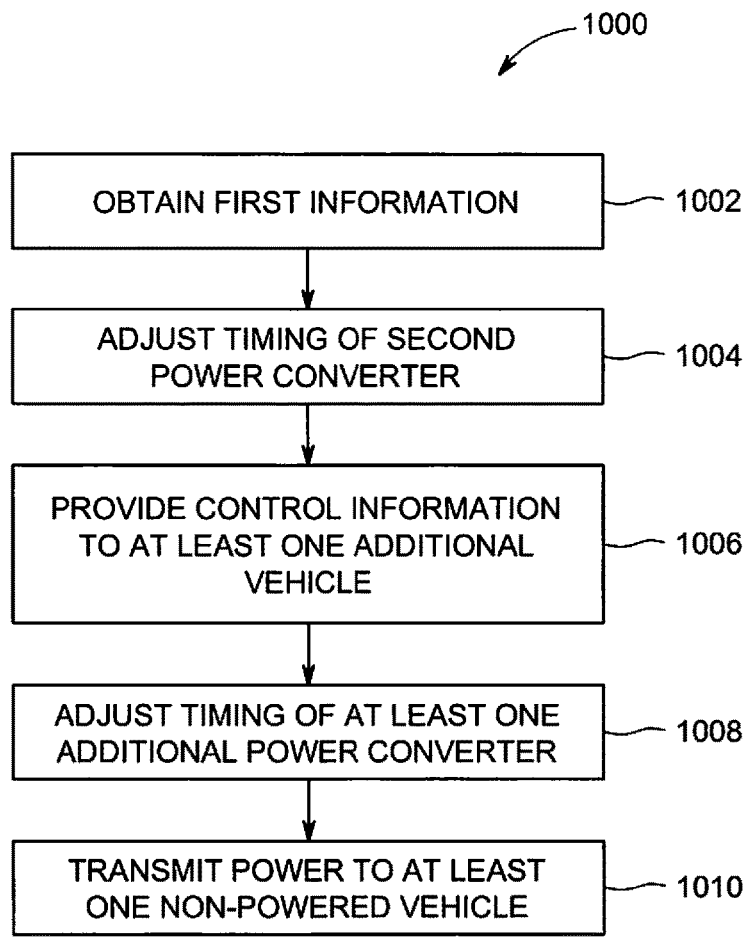
FIG. 10 is a flowchart of one embodiment of a method for controlling power converters (e.g., inverters).

FIG. 10 provides a flowchart depicting a method 1000 of controlling power converters (e.g., inverters) formed in accordance with an embodiment of the present inventive subject matter. In certain embodiments, certain operations may be added or omitted, certain steps may be performed simultaneously with other steps, certain steps may be performed in different order, and certain steps may be performed more than once, for example, in an iterative fashion.

At 1002, first information is obtained. The first information is regarding the timing of a first power converter (e.g., first power converter 810) disposed on a first vehicle (e.g., first vehicle 802). The first power converter may be configured to receive direct current and output alternating current. The first vehicle may be a powered or propulsion unit, for example a powered vehicle of a consist configured for HEP operation.

At 1004, the timing of a second power converter (e.g., second power converter 820) is adjusted. In various embodiments, the second power converter is disposed onboard the first vehicle (the same vehicle as the first power converter). The timing of the second power converter may be adjusted to substantially synchronize with the timing of the first power converter as discussed herein.

At 1006, control information regarding the timing of the first power converter is provided to at least one additional vehicle (e.g., second vehicle 804). The control information may be transmitted, for example, from a first control module that controls the first power converter to a control module (e.g., third control module 870) disposed on the second vehicle which controls a power converter (e.g., third power converter 850) disposed on the second vehicle. It may be noted that the control information may be provided to the second vehicle in a first mode of operation (e.g., HEP) as discussed herein, but not provided in a second mode of operation (e.g., a non-HEP mode of operation).

At 1008, the timing of at least one additional power converter (e.g., third power converter 850, fourth power converter 860) is adjusted. The at least one additional power converter is dispose on a vehicle to which the control information was provided or communicated at 1006. The timing of the at least one additional power converter may be adjusted to substantially synchronize with the first power converter as discussed herein.

At 1010, power is transmitted to at least one non-powered vehicle. Power from one or more power converters on the first and/or second vehicles is transmitted to at least one non-powered vehicle of a consist including the first vehicle and the at least one additional vehicle in various embodiments. For example, power from power converters disposed on a first vehicle (e.g., first vehicle 802) and a second vehicle (e.g., second vehicle 804) that has been substantially synchronized may be supplied to one or more non-powered vehicles (e.g., non-powered units 806).

In another embodiment, a power converter control system includes a first power converter, at least one additional power converter, a first control module, and at least one additional control module. The first power converter is configured to receive direct current and output alternating current as a first power output. The at least one additional power converter is configured to receive direct current and output alternating current as at least one additional power output. The first control module is configured to control timing associated with the first power converter. The at least one additional control module is associated with the at least one additional power converter and is configured to control timing associated with the at least one additional power converter. The first control module is configured to communicate first information regarding the timing of the first power converter to the at least one additional control module. The at least one additional control module is configured to adjust the timing of the at least one additional power converter to correspond with the timing of the first power converter.

In another aspect, the at least one additional control module is configured to communicate second information regarding the timing of the at least one additional power converter to the first control module. The first control module is configured to adjust the timing of the first power converter to correspond with the timing of the at least one additional power converter.

In another aspect, the at least one additional control module is configured to adjust the timing of the at least one additional power converter to provide a combined power output to an electric load. In one mode of operation, an electric power of the combined power output is greater than a combination of the first power output and the at least one additional power output prior to adjusting the timing of the at least one additional power output. In another mode of operation (e.g., wherein the timing of the at least one additional power converter is not adjusted or synchronized), the electric power of the combined power output is not greater than the combination of the first power output and the at least one additional power output.

In another aspect, the power converter system is associated with a vehicle HEP system. The first power converter and the at least one additional power converter are configured to receive the direct current energy from a powered vehicle. The combined power output is provided to a non-powered unit of a vehicle system that includes the powered vehicle.

In another aspect, the first power output of the first power converter and the at least one additional power outputs of the at least one additional power converters are provided to separate receiving units.

In another aspect, the first power converter and the at least one additional power converter are configured to receive the direct current from a powered vehicle. The first power output is provided to a first tractive motor associated with a first axle of the powered vehicle and the at least one additional power output is provided to a second tractive motor associated with a second axle of the powered vehicle.

In another aspect, the first information from the first control module includes at least one of times or time periods at which one or more events occur in a waveform of the first power output from the first power converter. The at least one additional control module is configured to change the at least one additional power output of the at least one additional power converter such that the one or more events in the waveform of the first power output are temporally substantially synchronized with one or more corresponding events in a waveform of the at least one additional power output. The term "temporal" may be understood as relating or pertaining to time.

In another aspect, the first control module is configured to communicate the first information to the at least one additional control module over a single wire. In another aspect, the first control module and the at least one additional control module are configured to communicate the first information without overhead delays.

In another embodiment, another power converter control system includes a first module and a second module. The first module is configured to control a first power converter that provides a first power output. The second module is configured to control a second power converter that provides a second power output. The first module is configured to communicate first timing information corresponding to timing of events in the first power converter to the second module via a communication link. The second module is configured to adjust timing of events in the second power converter to coincide with the events in the first power converter.

In another aspect, the second module is configured to communicate second timing information corresponding to the timing of the events in the second power converter to the first module. At least one of the first module or the second module is configured to determine when the second module is unable to adjust the timing of the events in the second power converter to coincide with the events in the first power converter.

In another aspect, the first module is configured to adjust the timing of the events in the first power converter to coincide with the events in the second power converter when the second module is unable to adjust the timing of the events in the second power converter to coincide with the events in the first power converter.

In another aspect, the first and second modules are configured to communicate the first timing information over a single wire.

In another aspect, the first power converter and the second power converter are configured to be operably connected to a power source of a powered vehicle unit. The first power converter and the second power converter are operably electrically coupled for the first power output and the second power output to be combined to form a combined power output that is provided to a non-powered vehicle unit interconnected with the powered vehicle unit.

In another aspect, the first module and the second module are configured to be operably connected to a vehicle power source of a vehicle. The first power converter and the second power converter are separately respectively coupled for the first power output and the second power output to be provided to separate receiving units configured to provide power to axles for propelling the vehicle.

In another aspect, the first timing information includes event information and period information. The event information corresponds to the events that are representative of a waveform of the first power output. The period information represents a period of the waveform. The second module is configured to adjust the timing of the events in the second power output to synchronize the events in the second power converter with both the period information and the event information of the first power converter.

In another aspect, the first module is configured to communicate the first timing information to the second module as a synchronization signal that includes a series of pulses relating to the timing of events in the first power converter.

In another aspect, the system also includes a feedback line configured to communicatively connect the first module and the second module. The second module is configured to provide second timing information regarding the second power converter to the first module over the feedback line.

In another aspect, the second module is configured to adjust the timing of the events in the second power converter to coincide with the events in the first power converter by reducing temporal differences between when the events in the first power converter occur and when the events in the second power converter occur.

In another aspect, the events in the first power output and the events in the second power output are common events.

In another aspect, the second module is configured to adjust the timing of the events in the second power converter to coincide with the events in the first power converter such that an electric power of a combination of the first power output and the second power output is greater relative to prior to the second module adjusting the timing of the events in the second power output.

In another embodiment, a method (e.g., for temporally synchronizing multiple power converters) includes obtaining first timing information representative of timing of events in a first power converter, communicating the first timing information to a second inverter control module that is configured to control timing of events in a second power converter, and, in a first mode of operation adjusting the timing of the events in the second power converter, responsive to the first timing information that is received, to synchronize the timing of the events in the second power converter with the timing of the events in the first power converter.

In another aspect, communicating the first timing information includes representing the first timing information in a synchronization pulse.

In another aspect, the synchronization pulse includes event pulses representative of when the events occur in a waveform of the first power converter.

In another aspect, the first timing information includes event information and period information. The event information represents when the events occur in a waveform of the first power converter. The period information represents a period of a waveform of the first power converter.

In another aspect, the method also includes, in a second mode of operation that is initiated when it is not possible to synchronize the second power converter with the first power converter in the first mode of operation, adjusting the timing of the first power converter to synchronize with the timing of the second power converter.

In another aspect, the first power converter ids configured to provide a first power output and the second power converter is configured to provide a second power output, and the method also includes combining the first power output and the second power output into a combined output for one or more electric loads.

In another aspect, adjusting the timing of the events in the second power converter increases an electric power of the combined output relative to prior to adjusting the timing of the events in the second power output.

In another aspect, adjusting the timing of the events in the second power converter includes changing when the events in the second power converter occur so that the events in the second power converter occur at one of common times or at a predetermined phase shift with events of the first power converter.

In another aspect, the events in the first power converter and the event in the second power converter include one or more zero crossings, peaks, or valleys of waveforms in the first power converter and the second power converter, respectively.

Another embodiment relates to a power converter control system. The power converter control system comprises a first power converter and a second power converter, both located onboard a vehicle. The first power converter is operably coupled to a DC system of the vehicle, and is configured to convert DC power from the DC system to a first AC power output. The second power converter is operably coupled to the DC system of the vehicle, and is configured to convert DC power from the DC system to a second AC power output. (The DC system may be a DC bus, separate DC sources that receive power from a common power generation source onboard the vehicle, or separate DC sources that receive power from separate power sources.) The power converter control system further comprises a first module onboard the vehicle configured to control the first power converter, and a second module onboard the vehicle configured to control the second power converter. The first module is configured to communicate first timing information corresponding to timing of events in the first power converter to the second module via a single wire (e.g., a conductive unit including only a single conductive path) communication link. In one embodiment of the power converter control system, the second module is configured to attempt to adjust timing of events in the second power converter to substantially synchronize with the events in the first power converter, based on the first timing information. If the attempt is successful, the events of the second power converter are substantially synchronized with the events in the first power converter. If the attempt is unsuccessful, the second module is configured to communicate second timing information corresponding to the timing of the events in the second power converter to the first module over the single wire communication link, for the first module to adjust the timing of the events in the first power converter module to substantially synchronize with the events in the second power converter. In another embodiment of the power converter control system, the second module is configured to determine if it is possible to adjust timing of events in the second power converter to substantially synchronize with the events in the first power converter, based on the first timing information. If so, the second module is configured to adjust the timing of the events in the second power converter to substantially synchronize with the events in the first power converter, based on the first timing information. If not, the second module is configured to communicate the second timing information corresponding to the timing of the events in the second power converter to the first module over the single wire communication link, for the first module to adjust the timing of the events in the first power converter module to substantially synchronize with the events in the second power converter. The substantially synchronized power outputs of the first power converter module and the second power converter module, for example, may be combined into a combined power output.

In another embodiment, a method (e.g., control method) comprises obtaining first timing information representative of timing of events in a first power converter. The first timing information is obtained by a first power converter control module configured to control the timing of the events in the first power converter. The method further comprises communicating the first timing information to a second power converter control module configured to control timing of events in a second power converter. The first power converter control module, the first power converter, the second power converter control module, and the second power converter are located onboard a vehicle. The first power converter and the second power converter are configured to convert DC power from a DC system of the vehicle to first and second AC power outputs, respectively. The method further comprises, in a first mode of operation, adjusting the timing of the events in the second power converter, responsive to the first timing information that is received, to substantially synchronize the timing of the events in the second power converter with the timing of the events in the first power converter. The method further comprises an alternative, second mode of operation, which is initiated instead of the first mode of operation when it is not possible to synchronize the second power converter with the first power converter in the first mode of operation. In the second mode of operation, the method comprises adjusting the timing of the events in first power converter to synchronize with the timing of the events in the second power converter, e.g., by the second power converter control module communicating second timing information, representative of the timing of the events in the second power converter, to the first power converter control module. In embodiments, the first timing information and the second timing information are communicated over a single wire.

In another embodiment, a power converter control system includes a first power converter, at least one additional power converter, a first control module, and at least one additional control module. The first power converter is configured to be disposed on a first vehicle. The first power converter is configured to receive direct current and to output alternating current as a first power output. The at least one additional power converter is configured to be disposed on the first vehicle. The at least one additional power converter is configured to receive direct current and to output alternating current as at least one additional power output. The first control module is configured to be disposed on the first vehicle and to control timing of the first power converter. The at least one additional control module is configured to be disposed on the first vehicle. The at least one additional control module is associated with the at least one additional power converter and is configured to control timing of the at least one additional power converter. The first control module is configured to communicate first information regarding the timing of the first power converter to the at least one additional control module. The at least one additional control module is configured to adjust the timing of the at least one additional power converter to correspond with the timing of the first power converter. The first control module is configured to communicate control information regarding the timing of the first power converter to at least one additional vehicle for synchronization of at least one power converter of the at least one additional vehicle with the timing of the first power converter.

In another aspect, the first vehicle is a powered rail unit. The first control module is configured to communicate the control information when the first vehicle is operated in a head end power (HEP) mode of operation.

In another aspect, the at least one additional vehicle comprises a second vehicle. The system further includes a third power converter, a fourth power converter, a third control module, and a fourth control module. The third power converter is configured to be disposed on the second vehicle. The third power converter is configured to receive direct current and to output alternating current as a third power output. The fourth power converter is configured to be disposed on the second vehicle. The fourth power converter is configured to receive direct current and to output alternating current as a fourth power output. The third control module is configured to be disposed on the second vehicle and to control timing of the third power converter using the control information communicated by the first control module. The fourth control module is configured to be disposed on the second vehicle and to control timing of the fourth power converter using the control information communicated by the first control module.

In another aspect, the first and second vehicles are powered rail units, and the at least one additional power converter includes a second power converter configured to be disposed on the first vehicle. The first control module is configured to communicate the control information when the first vehicle is operated in a head end power (HEP) mode of operation, wherein power from the first and second power converters and the third and fourth power converters is substantially synchronized and provided to non-powered units.

In another aspect, the first control module is configured to communicate the control information in a first mode of operation, but not to communicate the control information in a second mode of operation.

In another embodiment, a method includes obtaining first information regarding timing of a first power converter disposed on a first vehicle. The method also includes adjusting the timing of a second power converter disposed on the first vehicle to substantially synchronize with the first power converter. Also, the method includes providing control information regarding the timing of the first power converter to at least one additional vehicle. Further, the method includes adjusting the timing of at least one additional power converter disposed on the at least one additional vehicle to substantially synchronize with the first power converter.

In another aspect, the method further includes transmitting power from the first power converter, second power converter, and at least one additional power converter to at least one non-powered vehicle of a consist including the first vehicle and the at least one additional vehicle.

In another aspect, the control information is provided to the at least one additional vehicle in a first mode of operation but not in a second mode of operation.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the inventive subject matter without departing from its scope. While the dimensions and types of materials described herein are intended to define the parameters of the inventive subject matter, they are by no means limiting and are exemplary embodiments. Many other embodiments will be apparent to one of ordinary skill in the art upon reviewing the above description. The scope of the inventive subject matter should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose several embodiments of the inventive subject matter, and also to enable one of ordinary skill in the art to practice the embodiments of inventive subject matter, including making and using any devices or systems and performing any incorporated methods. The patentable scope of the inventive subject matter is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

The foregoing description of certain embodiments of the present inventive subject matter will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, controllers or memories) may be implemented in a single piece of hardware (for example, a general purpose signal processor, microcontroller, random access memory, hard disk, and the like). Similarly, the programs may be stand alone programs, may be incorporated as subroutines in an operating system, may be functions in an installed software package, and the like. The various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" of the presently described inventive subject matter are not intended to be interpreted as excluding the existence of additional embodiments that also incorporate the recited features. Moreover, unless explicitly stated to the contrary, embodiments "comprising," "comprises," "including," "includes," "having," or "has" an element or a plurality of elements having a particular property may include additional such elements not having that property.

What is claimed is:

1. A power converter control system, the system comprising:
    a first power converter configured to receive direct current and output alternating current as a first power output;
    at least one additional power converter configured to receive direct current and output alternating current as at least one additional power output;
    a first control module configured to control timing of the first power converter; and
    at least one additional control module associated with the at least one additional power converter and configured to control timing of the at least one additional power converter;
    wherein the first control module is configured to communicate first information regarding the timing of the first power converter to the at least one additional control module;
    wherein the at least one additional control module is configured to adjust the timing of the at least one additional power converter to correspond with the timing of the first power converter;
    wherein the at least one additional control module is configured to adjust the timing of the at least one additional power converter to provide a combined power output to an electric load; and
    wherein, in one mode of operation, an electric power of the combined power output is greater than a combination of the first power output and the at least one additional power output prior to adjusting the timing of the at least one additional power output, and in a different mode of operation, the electric power of the combined power output is not greater than the combination of the first power output and the at least one power output.

2. The power converter control system of claim 1, wherein the at least one additional control module is configured to communicate second information regarding the timing of the at least one additional power converter to the first control module, and the first control module is configured to adjust the timing of the first power converter to correspond with the timing of the at least one additional power converter.

3. The power converter control system of claim 1, wherein the power converter system is associated with a vehicle head end power (HEP) system, the first power converter and the at least one additional power converter are configured to receive the direct current from a powered vehicle, and the combined power output is provided to a non-powered unit of a vehicle system that includes the powered vehicle.

4. The power converter control system of claim 1, wherein the first power output of the first power converter and the at least one additional power output of the at least one additional power converter are provided to separate receiving units.

5. The power converter control system of claim 4, wherein the first power converter and the at least one additional power converter are configured to receive the direct current from a powered vehicle, the first power output is provided to a first tractive motor associated with a first axle of the powered vehicle, and the at least one additional power output is provided to a second tractive motor associated with a second axle of the powered vehicle.

6. The power converter control system of claim 1, wherein the first information from the first control module includes at least one of times or time periods at which one or more events occur in a waveform of the first power converter, and the at least one additional control module is configured to change the timing of the at least one additional power converter such that the one or more events in the waveform of the first power converter are temporally substantially synchronized with one or more corresponding events in a waveform of the at least one additional power converter.

7. The power converter control system of claim 1, wherein the first control module is configured to communicate the first information to the at least one additional control module over a single wire.

8. The power converter control system of claim 7, wherein the first control module and the at least one additional control module are configured to communicate the first information without overhead delays.

9. A power converter control system comprising:
a first module configured to control a first power converter that provides a first power output; and
a second module configured to control a second power converter that provides a second power output;
wherein the first module is configured to communicate first timing information corresponding to timing of events in the first power converter to the second module via a communication link;
wherein the second module is configured to adjust timing of events in the second power converter to substantially synchronize with the events in the first power converter; and
wherein the second module is configured to adjust the timing of the events in the second power converter to coincide with the events in the first power converter by reducing temporal differences between when the events in the first power converter occur and when the events in the second power converter occur.

10. The power converter control system of claim 9, wherein the second module is configured to communicate second timing information corresponding to the timing of the events in the second power converter to the first module, and at least one of the first module or the second module is configured to determine when the second module is unable to adjust the timing of the events in the second power converter to coincide with the events in the first power converter.

11. The power converter control system of claim 10, wherein the first module is configured to adjust the timing of the events in the first power converter to coincide with the events in the second power converter when the second module is unable to adjust the timing of the events in the second power converter to coincide with the events in the first power converter.

12. The power converter control system of claim 9, wherein the first and second modules are configured to communicate the first timing information over a single wire.

13. The power converter control system of claim 9, wherein the first power converter and the second power converter are configured to be operably connected to a power source of a powered vehicle unit, and wherein the first power converter and the second power converter are operably electrically coupled for the first power output and the second power output to be combined to form a combined power output that is provided to a non-powered vehicle unit interconnected with the powered vehicle unit.

14. The power converter control system of claim 9, wherein the first module and the second module are configured to be operably connected to a vehicle power source of a vehicle, and wherein the first power converter and the second power converter are respectively coupled for the first power output and the second power output to be provided to separate receiving units configured to provide power to axles for propelling the vehicle.

15. The power converter control system of claim 9, wherein the first timing information includes event information and period information, the event information corresponding to the events representative of a waveform of the first power converter, the period information representing a period of the waveform, and wherein the second module is configured to adjust the timing of the events in the second power converter to synchronize the events in the second power converter with both the period information and the event information of the first power converter.

16. The power converter control system of claim 9, wherein the first module is configured to communicate the first timing information to the second module as a synchronization signal that includes a series of pulses relating to the timing of events in the first power converter.

17. The power converter control system of claim 9, further comprising a feedback line configured to communicatively connect the first module and the second module, wherein the second module is configured to provide second timing information regarding the second power converter to the first module over the feedback line.

18. The power converter control system of claim 9, wherein the events in the first power converter and the events in the second power converter are common events.

19. The power converter control system of claim 9, wherein the second module is configured to adjust the timing of the events in the second power converter to coincide with the events in the first power converter such that an electric power of a combination of the first power output and the second power output is greater relative to prior to the second module adjusting the timing of the events in the second power converter.

20. A method comprising:
obtaining first timing information representative of timing of events in a first power converter;
communicating the first timing information to a second power converter control module configured to control timing of events in a second power converter, wherein the first power converter is configured to provide a first power output and the second power converter is configured to provide a second power output; and
in a first mode of operation, adjusting the timing of the events in the second power converter, responsive to the first timing information that is received, to substantially synchronize the timing of the events in the second power converter with the timing of the events in the first power converter; and
combining the first power output and the second power output into a combined output for one or more electric loads;
wherein adjusting the timing of the events in the second power converter increases an electric power of the combined output relative to prior to adjusting the timing of the events in the second power converter.

21. The method of claim 20, wherein communicating the first timing information includes representing the first timing information in a synchronization pulse.

22. The method of claim 21, wherein the synchronization pulse includes event pulses representative of when the events occur in a waveform of the first power converter.

23. The method of claim 20, wherein the first timing information includes event information and period information, the event information representing when the events occur in a waveform of the first power converter, and the period information represents a period of the waveform of the first power converter.

24. The method of claim 20, further comprising, in a second mode of operation that is initiated when it is not possible to synchronize the second power converter with the first power converter in the first mode of operation, adjusting the timing of the first power converter to synchronize with the timing of the second power converter.

25. The method of claim 20, wherein adjusting the timing of the events in the second power converter includes changing when the events in the second power converter occur so that the events in the second power converter occur at one of common times or at a predetermined phase shift with the events in the first power converter.

26. The method of claim 25, wherein the events in the first power converter and the events in the second power converter include one or more zero crossings, peaks, or valleys of waveforms in the first power converter and the second power converter, respectively.

27. A power converter control system, the system comprising:
a first power converter configured to be disposed on a first vehicle, the first power converter configured to receive direct current and output alternating current as a first power output;
at least one additional power converter configured to be disposed on the first vehicle, the at least one additional power converter configured to receive direct current and output alternating current as at least one additional power output;
a first control module configured to be disposed on the first vehicle and to control timing of the first power converter; and
at least one additional control module configured to be disposed on the first vehicle, the at least one additional control module associated with the at least one additional power converter and configured to control timing of the at least one additional power converter;
wherein the first control module is configured to communicate first information regarding the timing of the first power converter to the at least one additional control module;
wherein the at least one additional control module is configured to adjust the timing of the at least one additional power converter to correspond with the timing of the first power converter;
wherein the first control module is configured to communicate control information regarding the timing of the first power converter to at least one additional vehicle for synchronization of at least one power converter of the at least one additional vehicle with the timing of the first power converter;
wherein the at least one additional vehicle comprises a second vehicle and the at least one power converter of the at least one additional vehicle comprises a third power converter and a fourth power converter both configured to be disposed on the second vehicle, the third power converter configured to receive direct current and output alternating current as a third power output and the fourth power converter configured to receive direct current and output alternating current as a fourth power output;
a third control module configured to be disposed on the second vehicle and to control timing of the third power converter using the control information communicated by the first control module; and
a fourth control module configured to be disposed on the second vehicle and to control timing of the fourth power converter using the control information communicated by the first control module.

28. The power converter control system of claim 27, wherein the first vehicle is a powered rail unit, and wherein the first control module is configured to communicate the control information when the first vehicle is operated in a head end power (HEP) mode of operation.

29. The power converter control system of claim 27, wherein the first and second vehicles are powered rail units, wherein the at least one additional power converter includes a second power converter configured to be disposed on the first vehicle, wherein the first control module is configured to communicate the control information when the first vehicle is operated in a head end power (HEP) mode of operation, wherein power from the first and second power converters and the third and fourth power converters is substantially synchronized and provided to non-powered units.

30. The power converter control system of claim 29, wherein the first control module is configured to communicate the control information in a first mode of operation, but not to communicate the control information in a second mode of operation.

31. A method comprising:
obtaining first information regarding timing of a first power converter disposed on a first vehicle;
adjusting the timing of a second power converter disposed on the first vehicle to substantially synchronize with the first power converter;

providing control information regarding the timing of the first power converter to at least one additional vehicle; and adjusting the timing of at least one additional power converter disposed on the at least one additional vehicle to substantially synchronize a first power output from the first power converter with at least one additional power output from the at least one additional power converter to provide a combined power output;

wherein, in a first mode of operation, an electric power of the combined power output is greater than a combination of the first power output and the at least one additional power output prior to adjusting the timing of the at least one additional power output, and in a different second mode of operation, the electric power of the combined power output is not greater than the combination of the first power output and the at least one power output.

32. The method of claim 31, further comprising transmitting power from the first power converter, second power converter, and at least one additional power converter to at least one non-powered vehicle of a consist including the first vehicle and the at least one additional vehicle.

33. The method of claim 31, wherein the control information is provided to the at least one additional vehicle in the first mode of operation but not in the second mode of operation.

* * * * *